United States Patent
Mizoi et al.

(10) Patent No.: US 8,233,410 B2
(45) Date of Patent: Jul. 31, 2012

(54) TELEPHONE SYSTEM

(75) Inventors: Toshiaki Mizoi, Tokyo (JP); Mamoru Maruyama, Tokyo (JP); Eiji Yokokawa, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 251 days.

(21) Appl. No.: 12/656,540

(22) Filed: Feb. 2, 2010

(65) Prior Publication Data

US 2010/0214963 A1    Aug. 26, 2010

(30) Foreign Application Priority Data

Feb. 2, 2009   (JP) ................................ P.2009-21646

(51) Int. Cl.
*H04L 12/16*   (2006.01)
*H04Q 11/00*   (2006.01)
*H04J 3/04*    (2006.01)
*H04J 3/02*    (2006.01)

(52) U.S. Cl. .......................... 370/261; 370/535; 370/537
(58) Field of Classification Search .................. 370/260, 370/261, 535, 537
See application file for complete search history.

(56) References Cited

U.S. PATENT DOCUMENTS
2006/0215584 A1 *   9/2006   Yoshida ........................ 370/260

FOREIGN PATENT DOCUMENTS
JP              2002-218068         8/2002
* cited by examiner

*Primary Examiner* — Ronald Abelson
(74) *Attorney, Agent, or Firm* — Jacobson Holman PLLC

(57) ABSTRACT

A telephone system that allows multiplexing and demultiplexing plural group calls through simple operations is provided. The telephone system includes a conference trunk creating unit that creates a conference trunk as required and has a multiplexing/demultiplexing special number table pre-storing a multiplexing special number and demultiplexing special number corresponding to plural group calls. After plural group calls start, if the multiplexing special number is input, a control unit causes the conference trunk creating unit to create a large-conference trunk, switches and connects the voices of plural group calls corresponding to the multiplexing special number to the large-conference trunk and starts the multiplexed group call. If the demultiplexing special number is input, the control unit causes the conference trunk creating unit to create plural small-conference trunks, connects and switches each group call corresponding to the demultiplexing special number to the small-conference trunk and starts the demultiplexed group calls.

12 Claims, 24 Drawing Sheets

FIG.6

| GROUP NUMBER | GROUP CALL SPECIAL NUMBER | MEMBER |
|---|---|---|
| 1 | #10 | |
| | | |
| | | ⋮ |
| 2 | #20 | |
| | | |
| | | ⋮ |
| 3 | #30 | |
| | | |
| | | ⋮ |

FIG.7

| SMALL-CONFERENCE TRUNK NO. | NUMBER OF ASSIGNED PEOPLE (NUMBER OF ASSIGNED TIME SLOTS) | GROUP CALL SPECIAL NUMBER | MEMBER |
|---|---|---|---|
| 1 | 32 | #10 | |
| 2 | 32 | #20 | |

FIG.8

| MULTIPLEXING SPECIAL NUMBER | DEMULTIPLEXING SPECIAL NUMBER | APPLICABLE GROUP CALL SPECIAL NUMBER | | |
|---|---|---|---|---|
| #512 | #612 | #10 | #20 | - |
| #523 | #623 | #20 | #30 | - |
| #513 | #613 | #10 | #30 | - |
| #500 | #600 | #10 | #20 | #30 |

FIG.9

| LARGE-CONFERENCE TRUNK NO. | MULTIPLEXING SPECIAL NUMBER | PARTICIPATING MEMBER |
|---|---|---|
| 1 | #512 | |

FIG.12

| CONTACT NUMBER | DETECTED SPECIAL NUMBER | CORRESPONDING PAGING LINE |
|---|---|---|
| 1 | #512 (MULTIPLEXING SPECIAL NUMBER OF GROUP CALLS NO.1 AND NO.2) | 1 |
| 2 | #523 (MULTIPLEXING SPECIAL NUMBER OF GROUP CALLS NO.2 AND NO.3) | 2 |
| 3 | #513 (MULTIPLEXING SPECIAL NUMBER OF GROUP CALLS NO.1 AND NO.3) | 3 |
| 4 | #500 (MULTIPLEXING SPECIAL NUMBER OF GROUP CALLS NO.1, NO.2 AND NO.3) | 4 |
| 5 | #612 (DEMULTIPLEXING SPECIAL NUMBER OF GROUP CALLS NO.1 AND NO.2) | 1 |
| 6 | #623 (DEMULTIPLEXING SPECIAL NUMBER OF GROUP CALLS NO.2 AND NO.3) | 2 |
| 7 | #613 (DEMULTIPLEXING SPECIAL NUMBER OF GROUP CALLS NO.1 AND NO.3) | 3 |
| 8 | #600 (DEMULTIPLEXING SPECIAL NUMBER OF GROUP CALLS NO.1, NO.2 AND NO.3) | 4 |

FIG.15

| MULTI-PLEXING SPECIAL NUMBER | DEMULTI-PLEXING SPECIAL NUMBER | GROUP LIST | STATE | ENTRANT INDICATION |
|---|---|---|---|---|
| #512 | #612 | 1,2 | | ENTRANT INDICATION |
| #523 | #623 | 2,3 | MULTI-PLEXING | ENTRANT INDICATION |
| #513 | #613 | 1,3 | | ENTRANT INDICATION |
| #500 | #600 | 1,2,3 | | ENTRANT INDICATION |

ENTRANT STATES/ GROUP 2 AND 3

| GROUP NUMBER | MEMBER NO. | MEMBER NAME | PARTICIPATION |
|---|---|---|---|
| 2 | 1100 | | YES |
| | 1101 | | YES |
| | 1102 | | YES |
| | 1103 | | NO |
| | 1104 | | NO |
| | 1105 | | YES |
| 3 | 1300 | | NO |
| | 1301 | | NO |
| | 1302 | | YES |
| | 1303 | | NO |
| | 1304 | | YES |
| | 1305 | | NO |
| | 1306 | | NO |

FIG.16A

| GROUP NAME | A | B | A+B | |
|---|---|---|---|---|
| GROUP CALL SPECIAL NUMBER | 90 | 91 | 92 | |
| MEMBER | 1 | 5 | 1 | 5 |
| | 2 | 6 | 2 | 6 |
| | 3 | 7 | 3 | 7 |
| | 4 | 8 | 4 | 8 |

FIG.16B

| | |
|---|---|
| GROUP CALL MULTIPLEXING SPECIAL NUMBER | 95 |
| GROUP CALL DEMULTIPLEXING SPECIAL NUMBER | 96 |

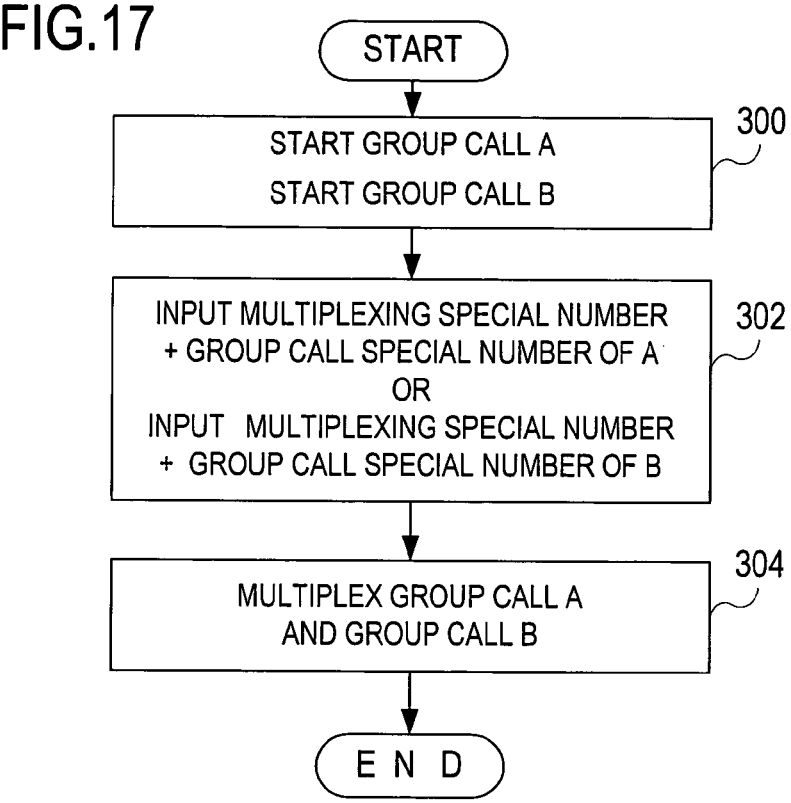
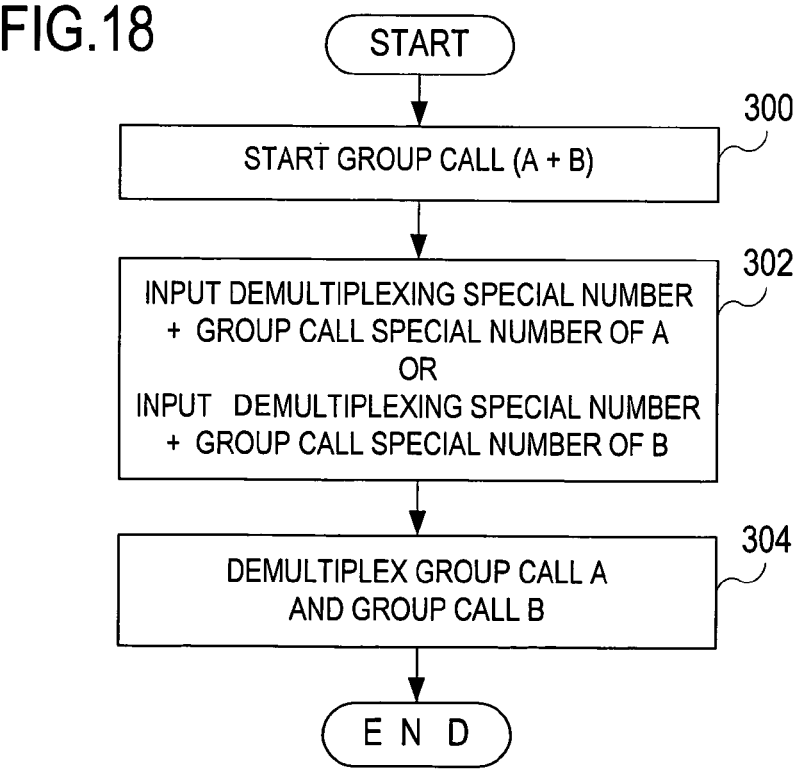

FIG.19A

CONFERENCE TRUNK STATE WHEN GROUP CALL A STARTS WITH SPECIAL NUMBER 90

| SMALL-CONFERENCE TRUNK | 90 | | |
|---|---|---|---|
| MEMBER | 1 | 2 | 3 |

FIG.19B

CONFERENCE TRUNK STATE WHEN GROUP CALL B STARTS WITH SPECIAL NUMBER 91

| SMALL-CONFERENCE TRUNK | 91 | | |
|---|---|---|---|
| MEMBER | 5 | 6 | 7 |

FIG.19C

CONFERENCE TRUNK STATE WHEN GROUP CALLS A AND B ARE MULTIPLEXED AS A RESULT OF INPUT OF MULTIPLEXING SPECIAL NUMBERS 95+91

| LARGE-CONFERENCE TRUNK | 100 | | | | | |
|---|---|---|---|---|---|---|
| GROUP CALL SPECIAL NUMBER | 90 | | | 91 | | |
| MEMBER | 1 | 2 | 3 | 5 | 6 | 7 |

FIG.19D

RECORDS ON SYNTHESIS TABLE IN CONTROL UNIT

| LARGE GROUP CALL NUMBER | LARGE-CONFERENCE TRUNK | GROUP CALL NUMBER BEING MULTIPLEXED | | | |
|---|---|---|---|---|---|
| 100 | 100 | 90 | 91 | | |
| 200 | 200 | 93 | 94 | | |
| 300 | 300 | 95 | 96 | 97 | |

FIG.20A
CONFERENCE TRUNK STATE WHEN GROUP CALL STARTS WITH SPECIAL NUMBER 92

| SMALL-CONFERENCE TRUNK | 92 | | | | | |
|---|---|---|---|---|---|---|
| MEMBER | 1 | 2 | 3 | 5 | 6 | 7 |

FIG.20B
CONFERENCE TRUNK STATE 1 WHEN GROUP CALL A IS DEMULTIPLEXED WITH DEMULTIPLEXING SPECIAL NUMBERS 96 + 90

| SMALL-CONFERENCE TRUNK | 90 | | |
|---|---|---|---|
| MEMBER | 1 | 2 | 3 |

FIG.20C
CONFERENCE TRUNK STATE 2 WHEN GROUP CALL A IS DEMULTIPLEXED WITH DEMULTIPLEXING SPECIAL NUMBERS 96 + 90

| SMALL-CONFERENCE TRUNK | 92 | | |
|---|---|---|---|
| MEMBER | 5 | 6 | 7 |

FIG.21A
CONFERENCE TRUNK STATE WHEN GROUP CALLS A AND B ARE MULTIPLEXED AS A RESULT OF INPUT OF MULTIPLEXING SPECIAL NUMBER 95 + 91 FROM MEMBER 1

| LARGE-CONFERENCE TRUNK | 100 | | | | | |
|---|---|---|---|---|---|---|
| GROUP CALL SPECIAL NUMBER | 90 | | | 91 | | |
| MEMBER | 1 | 2 | 3 | 5 | 6 | 7 |

FIG.21B
CONFERENCE TRUNK STATE 1 WHEN GROUP CALL A IS DEMULTIPLEXED WITH DEMULTIPLEXING SPECIAL NUMBERS 96 + 90

| SMALL-CONFERENCE TRUNK | 90 | | |
|---|---|---|---|
| MEMBER | 1 | 2 | 3 |

FIG.21C
CONFERENCE TRUNK STATE 2 WHEN GROUP CALL A IS DEMULTIPLEXED WITH DEMULTIPLEXING SPECIAL NUMBERS 96 + 90

| SMALL-CONFERENCE TRUNK | 91 | | |
|---|---|---|---|
| MEMBER | 5 | 6 | 7 |

FIG.22

| GROUP A<br>STARTING<br>BEING MULTIPLEXED<br>WITH GROUP B | GROUP B<br>STARTING<br>BEING MULTIPLEXED<br>WITH GROUP A | GROUP C<br>NOT STARTING<br>NOT MULTIPLEXED |
|---|---|---|
| GROUP D<br>STARTING<br>NOT MULTIPLEXED | GROUP E<br>STARTING<br>BEING MULTIPLEXED<br>WITH GROUP F | GROUP F<br>STARTING<br>BEING MULTIPLEXED<br>WITH GROUP E |
| GROUP G<br>NOT STARTING<br>NOT MULTIPLEXED | GROUP H<br>NOT STARTING<br>NOT MULTIPLEXED | GROUP I<br>NOT STARTING<br>NOT MULTIPLEXED |

OPERATIONS
- [START] GROUP [A]
- [MULTIPLEX] GROUP [A] AND GROUP [B]
- [DEMULTIPLEX] GROUP [A] AND GROUP [B]

FIG.23A

| GROUP NUMBER | MOVING SPECIAL NUMBER TO LARGE CONFERENCE ROOM | RETURNING SPECIAL NUMBER TO SMALL CONFERENCE ROOM |
|---|---|---|
| 1 | #11 | #12 |
| 2 | #21 | #22 |
| 3 | #31 | #33 |

FIG.23B

| GROUP NUMBER | MOVING SPECIAL NUMBER TO LARGE CONFERENCE ROOM 1 | MOVING SPECIAL NUMBER TO LARGE CONFERENCE ROOM 2 | ... | RETURNING SPECIAL NUMBER TO SMALL CONFERENCE ROOM |
|---|---|---|---|---|
| 1 | #11 | #12 | ... | #19 |
| 2 | #21 | #22 | ... | #29 |
| 3 | #31 | #32 | ... | #39 |
| 4 | #41 | #42 | ... | #49 |
| 5 | #51 | #52 | ... | #59 |

TELEPHONE SYSTEM

This application has a priority of Japanese no. 2009-021646 filed Feb. 2, 2009, hereby incorporated by reference.

BACKGROUND OF THE INVENTION

1. Field of the Invention

The present invention relates to telephone systems that implement group calls by using time-division voice exchange and may be used for in-facility radio systems. Particularly, the invention relates to a telephone system that can synthesize voice efficiently and at low costs flexibly in accordance with multiplexing or demultiplexing of plural group calls and can control the voice level and/or voice quality of a multiplexed group call in an optimum way.

2. Description of the Related Art

[Description of the Related Art/FIG. 26]

Hitherto, there have been telephone systems that implement group calls by using time-division voice exchange. With reference to FIG. 26, a conventional telephone system will be described. FIG. 26 is a schematic configuration diagram of a conventional telephone system.

As shown in FIG. 26, a conventional telephone system includes a control unit 1', a time switch 2, conference trunks 3-1 to 3-n, a line interface unit 4, voice message output means 6 and a state indicating unit 7 fundamentally. The line interface unit 4 further connects to a base station 51, a telephone 52, a contact input/output unit 53 and a dedicated line etc. 54 and to a mobile device 55 through the base station 51.

Voice highways through which voice signals are transmitted are provided between the time switch 2 and the conference trunk 3, line interface unit 4 and voice message output means 6 and between the line interface 4 and the base station 51, telephone 52, contact input/output unit 53 and dedicated line etc. 54.

[Configurations of Components]

The components will be described more specifically.

The control unit 1' may be a computer including a microprocessor, peripheral circuits and a memory, for example, and starts a program stored in the memory and controls the time switch 2, conference trunk 3 and line interface 4 so as to perform processing for implementing a private call or group calls.

The time switch 2 connects to an input highway and output highway through which a voice signal are transmitted and is a switch that performs time-division exchange for each time slot of the highways. The time switch 2 can exchange (or connect) a time slot of an arbitrary highway with (or to) a time slot of another highway in accordance with the instruction from the control unit 1'.

The conference trunk 3 performs voice synthesis processing including synthesizing and outputting voice of plural callers and synthesizes voice data (which is PCM-encoded data) of plural input time slots and outputs the result to a time slot of one output highway. Thus, a group call state can be acquired. The number of time slots of an input highway of a conventional conference trunk is 32, whereby 32 people can participate in a conference.

In the conventional system, each of the conference trunks 3-1 to 3-n is configured by an independent LSI chip.

The line interface unit 4 connects between the base station 51, telephone 52, contact input/output 53, dedicated lines etc. 54 and so on and the time switch 2 and control unit 1'. Control signals and a voice highway are connected, and the control signals are connected to the control unit 1', whereby call control signals such as ON hook, OFF hook, dialing, a contact input event and a contact output event are transmitted. The voice highway connects to the time switch 2 and a voice signal (PCM code) is transmitted by the voice highway.

The voice message output means 6 includes a memory storing voice message data recorded in advance and a circuit that outputs a voice message to a time slot of a highway. Examples of the message may be a message "The terminal you are calling is not available because it is outside of its service area or is switched off".

The state indicating unit 7 connects to the control unit 1' and is a personal computer including a display and an operation unit. The state indicating unit 7 is a maintenance terminal that indicates the state of the control unit 1' or maintains the system.

[Conventional Group Calls/FIG. 27]

In the conventional telephone system the control unit 1' prestores a group call special number for participating in a group call and members who perform the group call and associates the group call special number and the conference trunk 3 that performs the voice synthesis.

If the group call special number is called, the control unit 1' calls the members corresponding to the group call special number and connects the caller of the special number and the OFF hooking members to the conference trunk 3 corresponding to the group call special number to provide the group call.

With reference to FIG. 27, voice synthesis in the group call will be described. FIG. 27 is a schematic explanatory diagram of a voice highway for a conventional group call.

As shown in FIG. 27, when members A, B and C are performing a group call, the member A connects to an input highway a and an output highway a, the member B connects to an input highway b and an output highway b, and the member C connect to an input highway c and an output highway c. The input highways are used to transfer voice, and the output highways are used to transfer receive voice.

The voice data on the input highways a, b and c input from the line interface unit 4 to the time switch 2 are output from the time switch 2 through the output highways to the specific conference trunk n in accordance with the instruction from the control unit 1'.

The conference trunk n outputs the data resulting from the synthesis of voices of B and C to the time slot corresponding to A of the input highway d.

Similarly, the conference trunk n outputs the data resulting from the synthesis of voices of A and C to the time slot corresponding to B of the input highway d and outputs the data resulting from the synthesis of voices of A and B to the time slot corresponding to C of the input highway d.

The time switch 2 outputs the time slots to the corresponding output highways a, b and c.

Thus, each of the members can hear all voices of the other members excluding the voice of himself/herself, implementing the group call.

[Talking Together Among Plural Group Calls/FIG. 28]

In the conventional telephone system, the members are fixed by a group call special number. Thus, in order to implement both of the conference with a specific group call and the conference including the members of another group call, group special numbers, members and conference trunks must be defined in association for both of a group call for a small number of people and a group call for a large number of people.

Talking together among plural group calls will be described with reference to FIG. 28. FIG. 28 is a schematic explanatory diagram showing a method for talking together among plural group calls in the conventional telephone system.

As illustrated in FIG. 28, the conventional telephone system may have definitions of, among members 1 to 8, a group call A of 1 to 4 ("conference call A" in FIG. 28), a group call B (conference call B) of 5 to 8 and a group call C (conference call C) of 1 to 8.

After the group call A and group call B start, if it is determined to start a conference in conjunction between the group A and group B, the members of the group call A and the members of the group call B once leaves the group calls. After that, one of the members calls the group call special number C newly to start the group call C including the members 1 to 8. This complicates the terminal operations.

[Multiplexing Plural Group Calls in Conventional Telephone System]

There has been another method that couples plural group calls on voice lines into an appearance of one group call. For example, according to the method, the voice of a group call A is fed onto an analog line A, the voice of a group call B is fed onto an analog line B, and the analog lines A and B are physically connected. Thus, the plural group calls can be multiplexed.

Also on digital lines, the synthesized voice of two group calls may be further synthesized by using another conference trunk so that the plural group calls can be multiplexed. (Refer to JP-A-2002-218068).

Generally, when voices of plural lines are synthesized, the voice level is increased (or is saturated), which causes a distortion and difficulty in hearing. In order to solve the problem, each conference trunk lowers the input voice level before the synthesis to perform the level control in the synthesis for an optimum level.

However, in the conventional telephone system, the method for the apparent multiplexing of plural group calls includes controlling the voice level and/or voice quality at the conference trunks before the multiplexing. For that reason, it is difficult to control the voice level and/or voice quality in consideration of all voices after the multiplexing, and it is thus difficult to adjust the level and voice quality in an optimum way, which is a problem.

Furthermore, in the conventional telephone system, there is no function to notify whether the state of the target group call to be multiplexed or demultiplexed is currently a result of multiplexing or demultiplexing, which is inconvenient for an operator or a maintenance operator and is another problem.

SUMMARY OF THE INVENTION

The invention was made in view of the situations, and it is an object of the invention to provide a telephone system that allows multiplexing and demultiplexing plural group calls through simple operations, optimum adjustment of the voice level and/or voice quality after the multiplexing, and informing the multiplexed or demultiplexed state in an easy-to-understand way.

The invention for solving the problems in the conventional systems is a telephone system that implements a group call, the system including a conference trunk creating unit that creates a conference trunk that corrects and synthesizes voices from plural terminals in accordance with an instruction, and a control unit that prestores a unique number of a group call and the numbers of plural terminals belonging to the group call, outputs an instruction to create a conference trunk to the conference trunk creating unit when the unique number of the group call is called, calls the terminals belonging to the group call on the basis of the stored number, connects the calling terminal and OFF hooking (answering) terminals to the created conference trunk and starts the group call, wherein after plural group calls start, if the control unit receives the input of a multiplex request to multiplex the plural group calls, the control unit outputs an instruction to create a conference trunk for multiplexing to the conference trunk creating unit, and switches and connects the connection destination of the terminals participating in the plural group call from the conference trunks to the conference trunk for multiplexing. Thus, a required conference trunk may only be created in accordance with the operating condition of a group call or group calls or a multiplex request, and voice synthesis processing relating to group calls may be performed efficiently and at low costs. By connecting terminals of plural group calls to the created conference trunk for multiplexing, the plural group calls may be multiplexed. Furthermore, since all participants after multiplexing are connected to one same conference trunk, control may be performed for optimum voice level and/or voice quality, and users may only be required to perform easy operations for multiplexing by a user.

In the telephone system, if the control unit receives the input of a demultiplex request to demultiplex a specific group call to plural group calls, the control unit may identify the group calls to be demultiplexed in accordance with the demultiplex request, output an instruction to create conference trunks for demultiplexing to the conference trunk creating unit on the basis of the number of the group calls to be demultiplexed, associate the created conference trunks for demultiplexing with the group calls to be demultiplexed, switch and connect the connection destination of the terminals belonging to the group calls to be demultiplexed from the conference trunk of the specific group call to the conference trunks for demultiplexing associated with the group calls to be demultiplexed, for each of the group calls to be demultiplexed, and start the demultiplexed group calls. Thus, a group call can be demultiplexed to desirable group calls through the simple operations.

The telephone system may further include a notifying unit that outputs a voice message to terminals participating in a group call on the basis of the instruction from the control unit. In this case, the control unit may output the instruction to output a voice message indicating the multiplexed state to the notifying unit when plural group calls are multiplexed in accordance with a multiplex request. Thus, users of the terminals participating in the group calls can easily recognize that the group calls have been multiplexed, which can improve the convenience.

The telephone system may further includes a notifying unit that outputs a voice message to terminals participating in a group call on the basis of the instruction from the control unit. In this case, the control unit may output the instruction to output a voice message indicating the demultiplexed state to the notifying unit when a specific group call is demultiplexed to plural group calls in accordance with a demultiplex request. Thus, users of the terminals participating in the group call can easily recognize that the group call have been demultiplexed, which can improves the convenience.

The telephone system may further include an indicating unit. In this case, the control unit may cause the indicating unit to display a group-call multiplexed state and cause the indicating unit to display the entry states of terminals that can participate in the multiplexed group call. Thus, a maintenance operator can recognize the participants of the multiplexed group call, which can improves the convenience.

BRIEF DESCRIPTION OF THE DRAWINGS

FIG. 6 is a schematic explanatory diagram of a group call management table;

FIG. 7 is a schematic explanatory diagram of a small-conference trunk management table;

FIG. 8 is a schematic explanatory diagram of a multiplexing/demultiplexing special number table;

FIG. 9 is a schematic explanatory diagram of a large-conference trunk management;

FIG. 12 is a schematic explanatory diagram of the multiplexing/demultiplexing special number table with contact input;

FIG. 15 is a schematic explanatory diagram illustrating indication examples by a state indicating unit 7 in the first system;

FIG. 16A is a schematic explanatory diagram of a group call management table in a second system, and FIG. 16B is a schematic explanatory diagram illustrating examples of the special numbers;

FIG. 17 is a flowchart illustrating schematic processing for multiplexing group calls in the second system;

FIG. 18 is a flowchart illustrating schematic processing for demultiplexing a group call in the second system;

FIGS. 19A to 19D are schematic explanatory diagrams illustrating the states of conference trunks in multiplexing in the second system;

FIGS. 20A to 20C are schematic explanatory diagrams illustrating the states of conference trunks in demultiplexing an unmultiplexed group call in the second system;

FIGS. 21A to 21C are schematic explanatory diagrams illustrating conference trunks in demultiplexing a multiplexed group call in the second system;

FIG. 22 is an explanatory diagram illustrating indication examples in the second system;

FIGS. 23A and 23B are explanatory diagrams illustrating examples of a large-conference-room special-number table in a third system;

Figure 1:
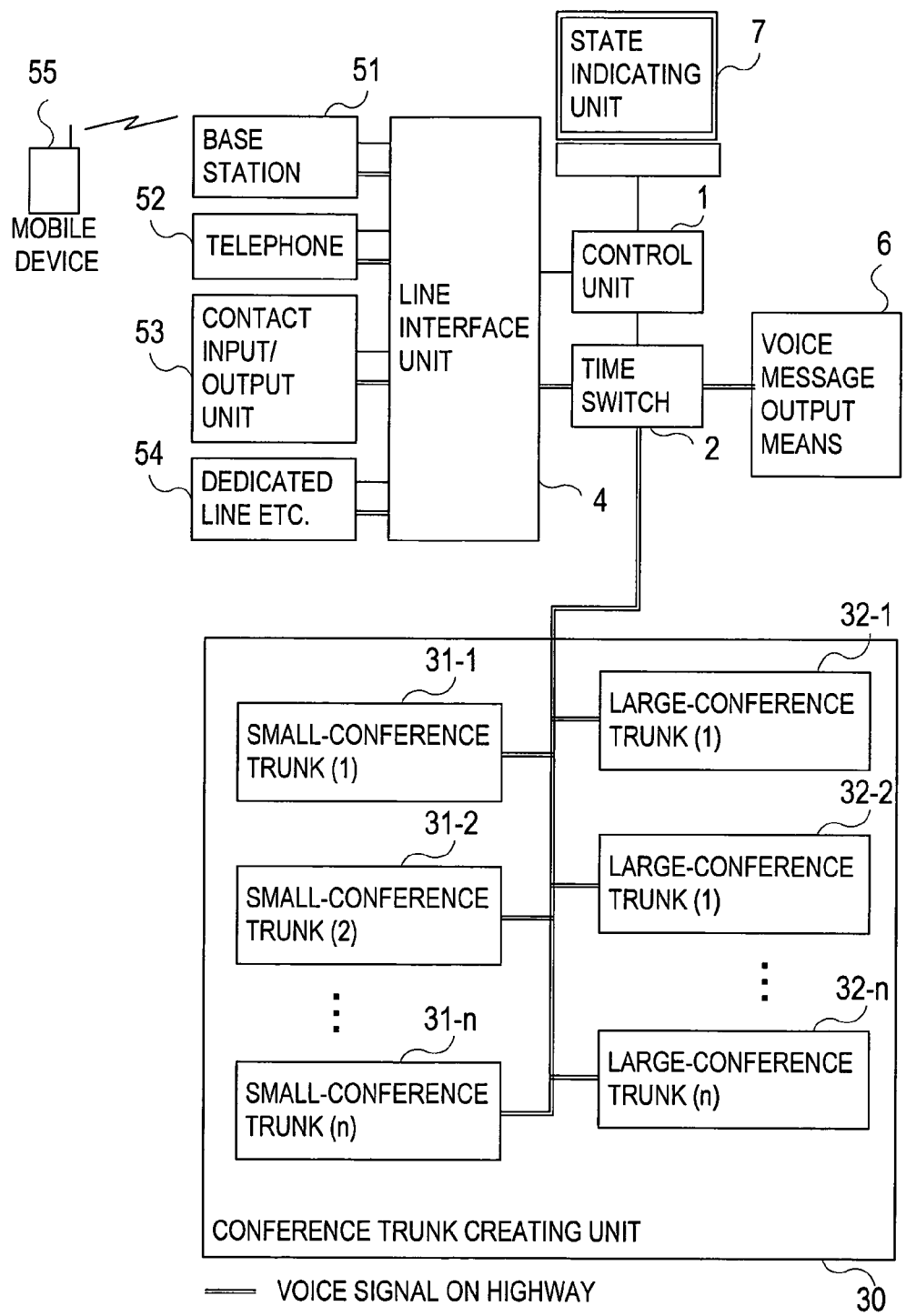
FIG. 1 is a configuration block diagram of a telephone system (first system) according to a first embodiment of the invention.

DESCRIPTION OF REFERENCE NUMERALS 1 control unit
2 time switch
3 conference trunk
4 line interface unit
6 voice message output means
7 state indicating unit
30 conference trunk creating unit
31 small-conference trunk
32 large conference trunk
51 base station
52 telephone
53 contact input/output unit
54 dedicated line etc.
55 mobile device

DESCRIPTION OF THE PREFERRED EMBODIMENTS

[Outline of the Invention]

Embodiments of the invention will be described with reference to drawings.

A telephone system according to an embodiment of the invention includes a conference trunk creating unit that creates a conference trunk as required and may have the setting of a multiplexing special number for multiplexing specific plural group calls. If, after plural group calls start, one of members inputs the multiplexing special number for multiplexing the group calls, a control unit causes the conference trunk creating unit to create a large-conference trunk, connects all of the voice highways of the corresponding group calls to the large-conference trunk, and multiplexes the group calls. Thus, the simple operation can multiplex group calls. In the large-conference trunk, the multiplexed group calls can be handled as one group call to adjust the voice level and/or voice quality, as in the conventional systems. This can improve the convenience, and the voice can be adjusted in an optimum manner.

The telephone system according to the embodiment of the invention may have the setting of a demultiplexing special number for demultiplexing a multiplexed group call to the original group calls. If a member of the multiplexed group call inputs the demultiplexing special number, the control unit causes the conference trunk creating unit to create plural small-conference trunks and connects to the small-conference trunks for the group calls to demultiplex from the large-conference trunk. The simple operation can return the multiplexed group call to the original group calls.

First Embodiment/FIG. 1

A telephone system according to a first embodiment of the invention will be described with reference to FIG. 1. FIG. 1 is a configuration block diagram of a telephone system (first system) according to the first embodiment of the invention.

As illustrated in FIG. 1, the first system includes a control unit 1, a time switch 2, a line interface unit 4, voice message output means 6, a state indicating unit 7 and a conference trunk creating unit 30 fundamentally. The line interface unit 4 connects to a base station 51, a telephone 52, a contact input/output unit 53 and a dedicated line etc. 54 and connects to a mobile device 55 through the base station 51. Notably, since the components designated by the same reference numerals as those in FIG. 1 have the same or substantially the same configurations and operations, detailed description thereof will be omitted.

The first system is different from conventional systems in the processing in the control unit 1 and in that the first system includes the conference trunk creating unit 30. The first system is different from conventional systems in the details of an output message by the voice message output means 6 and in the details to be displayed by the state indicating unit 7.

The voice message output means 6 corresponds to a notifying unit according to an embodiment of the invention, and the state indicating unit 7 corresponds to an indicating unit according to an embodiment of the invention.

[Conference Trunk Creating Unit 30]

The characteristics of the first system will be described more specifically.

The conference trunk creating unit 30 is an LSI that performs voice synthesis processing that synthesizes and outputs the voices of plural callers and does not include a fixed conference trunk but creates a required conference trunk in accordance with the instruction from the control unit 1, which is a characteristic of the first system. The conference trunk creating unit 30 is implemented by one LSI in the first system.

In other words, instead of the voice synthesis to be performed independently at n conference trunks 3 in the conventional systems, the conference trunk creating unit 30 performs software processing including creating/deleting a virtual conference trunk as required and thus allows the voice synthesis on time slots efficiently flexibly for multiplexing or demultiplexing, which can further reduce the costs.

The conference trunk creating unit 30 in the first system can create two kinds of conference trunks of a small-conference trunk 31 for implementing a group call by a small number of people and a large-conference trunk 32 for implementing a multiplexed group call, as in the past. In the example in FIG. 1, the conference trunk creating unit 30 has created small-conference trunks (1) to (n) and created large-conference trunks (1) to (n). Notably, the large-conference trunk 32 corresponds to a conference trunk for multiplexing according to an embodiment of the invention.

Though the fundamental voice synthesis method with the small-conference trunk 31 and large-conference trunk 32 are similar to that in the past, the operations relating to the multiplexing and demultiplexing of a group call or group calls are different from those in the past.

It is assumed here that the small-conference trunk 31 has 32 time slots, and group calls by up to 32 people are allowed. The large-conference trunk 32 has 96 time slots, and group calls by up to 96 people are allowed.

The creation and operations of the small-conference trunk 31 or large-conference trunk 32 in the conference trunk creating unit 30 relating to the multiplexing or demultiplexing of a group call or group calls will be described later.

The small-conference trunk 31 and large-conference trunk 32 adjust the voice level and/or voice quality (such as echo), as in the past, so as to be optimum in accordance with the number of voices to be connected.

[Control Unit 1]

The control unit 1 controls over the entire telephone system, as in the past, and, further includes the characteristic of the first system that, if the control unit 1 receives the input of a group call request, multiplex request or demultiplex request through the line interface unit 4, the control unit 1 controls, as required, the conference trunk creating unit 30 so as to create the small-conference trunk 31 or large-conference trunk 32 and deletes the created small-conference trunk or large-conference trunk.

The control unit 1 further controls, as required, the voice message output means 6 to output a message that notifies a group-call multiplexed or demultiplexed state and controls the state indicating unit 7 so as to indicate a group-call multiplexed or demultiplexed state and the participants.

The operations by the control unit 1 will be described in detail later.

A memory (not illustrated) in the control unit 1 stores a table for managing group calls and the multiplexing and demultiplexing between group calls, and the control unit 1 performs processing with reference to the table as required. The table stored in the control unit 1 will be described later.

[Voice Message Output Means 6]

The voice message output means 6 in the first system prestores, in addition to the similar messages to those in conventional systems, data of the voice message that notifies a group-call multiplexed or demultiplexed state, and outputs to a specific participant in accordance with the instruction from the control unit 1.

Figure 2:
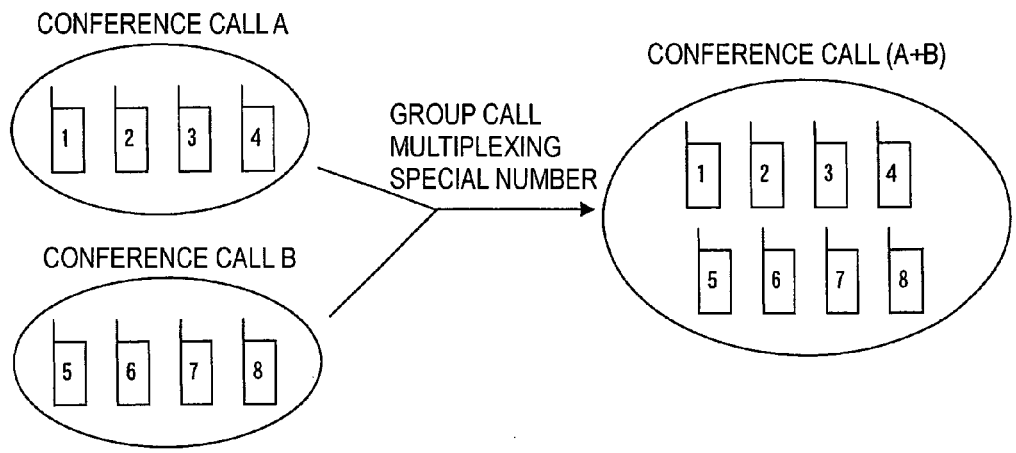
FIG. 2 is an explanatory diagram illustrating multiplexing on group calls in the first system.
Figure 3:
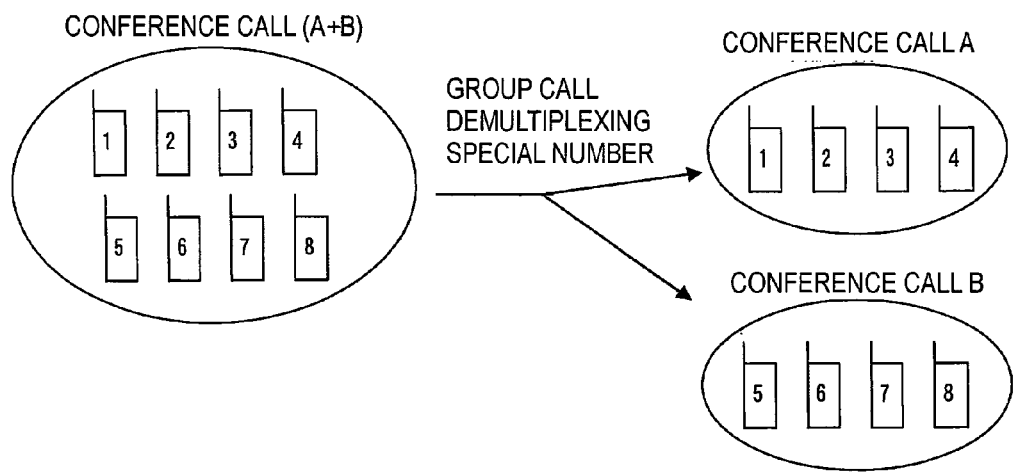
FIG. 3 is an explanatory diagram illustrating demultiplexing on group calls in the first system.

[Outline of First System/FIG. 2 and FIG. 3]

An outline of operations in the first system will be described with reference to FIG. 2 and FIG. 3. FIG. 2 is an explanatory diagram illustrating multiplexing on group calls in the first system, and FIG. 3 is an explanatory diagram illustrating demultiplexing on group calls.

As illustrated in FIG. 2, after a group call A ("conference call A" in FIG. 2) and a group call B (conference call B) start, if it is determined to preferably have a conference together, one of the participating members such as a conference leader may input a preset specific group-call-multiplexing special number. Thus, the control unit 1 causes the conference trunk creating unit 30 to create a large-conference trunk and connects the group call A and group call B to the same large-conference trunk. As a result, the group call (A+B) resulting from the multiplexing on the group call A and the group call B starts. The group-call-multiplexing special number is a characteristic of the first system and is prestored in association with plural group calls to be multiplexed.

As illustrated in FIG. 3, after the multiplexed group call (A+B) starts, if a preset specific group-call-demultiplexing special number is input, the control unit 1 causes the conference trunk creating unit 30 to create a small-conference trunk and demultiplexes the group call (A+B) to the group call A and group call B before the multiplexing. The group-call-demultiplexing special number is prestored in association with plural group calls having the group-call-multiplexing special number.

[Voice Synthesis Involved in Group Call Multiplexing]

Next, how voice synthesis is performed for group calls in the first system will be described.

Figure 4:
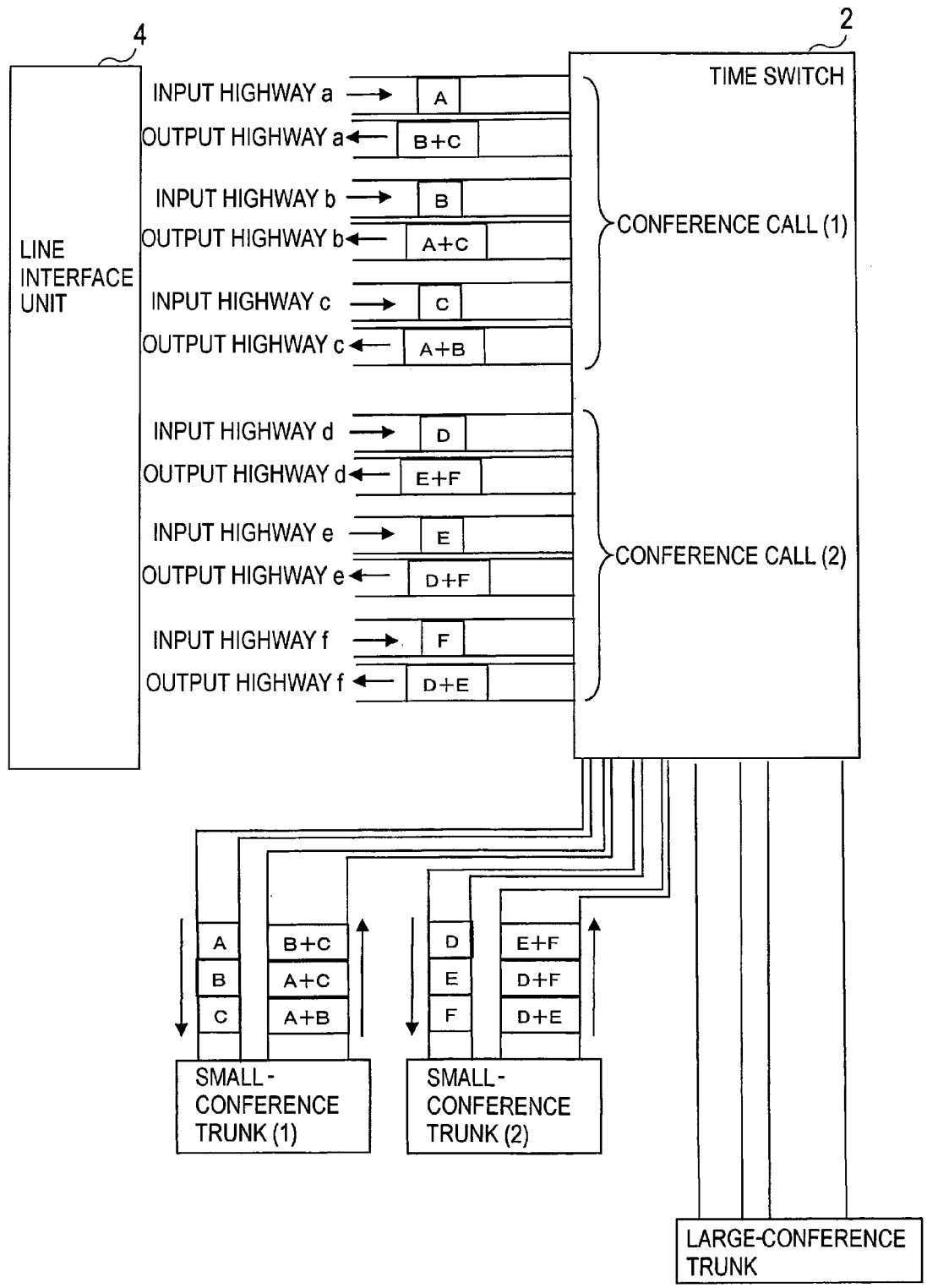
FIG. 4 is a schematic explanatory diagram illustrating a state of voice highways for group calls before multiplexing.

[State Before Multiplexing/FIG. 4]

First of all, the state before multiplexing will be described with reference to FIG. 4. FIG. 4 is a schematic explanatory diagram illustrating a state of voice highways for group calls before multiplexing.

In the example in FIG. 4, a group call (1) including members A, B and C (which is "conference call (1)" in FIG. 4) and a group call (2) including members D, E and F (which is "conference call (2)" in FIG. 4) have independently started.

Then, in accordance with the instruction from the control unit 1 in response to calling a group call special number of the group, the group call (1) is connected to the small-conference trunk (1) created in the conference trunk creating unit 30. Similarly, the group call (2) is connected to the small-conference trunk (2) created in the conference trunk creating unit 30.

Figure 27:
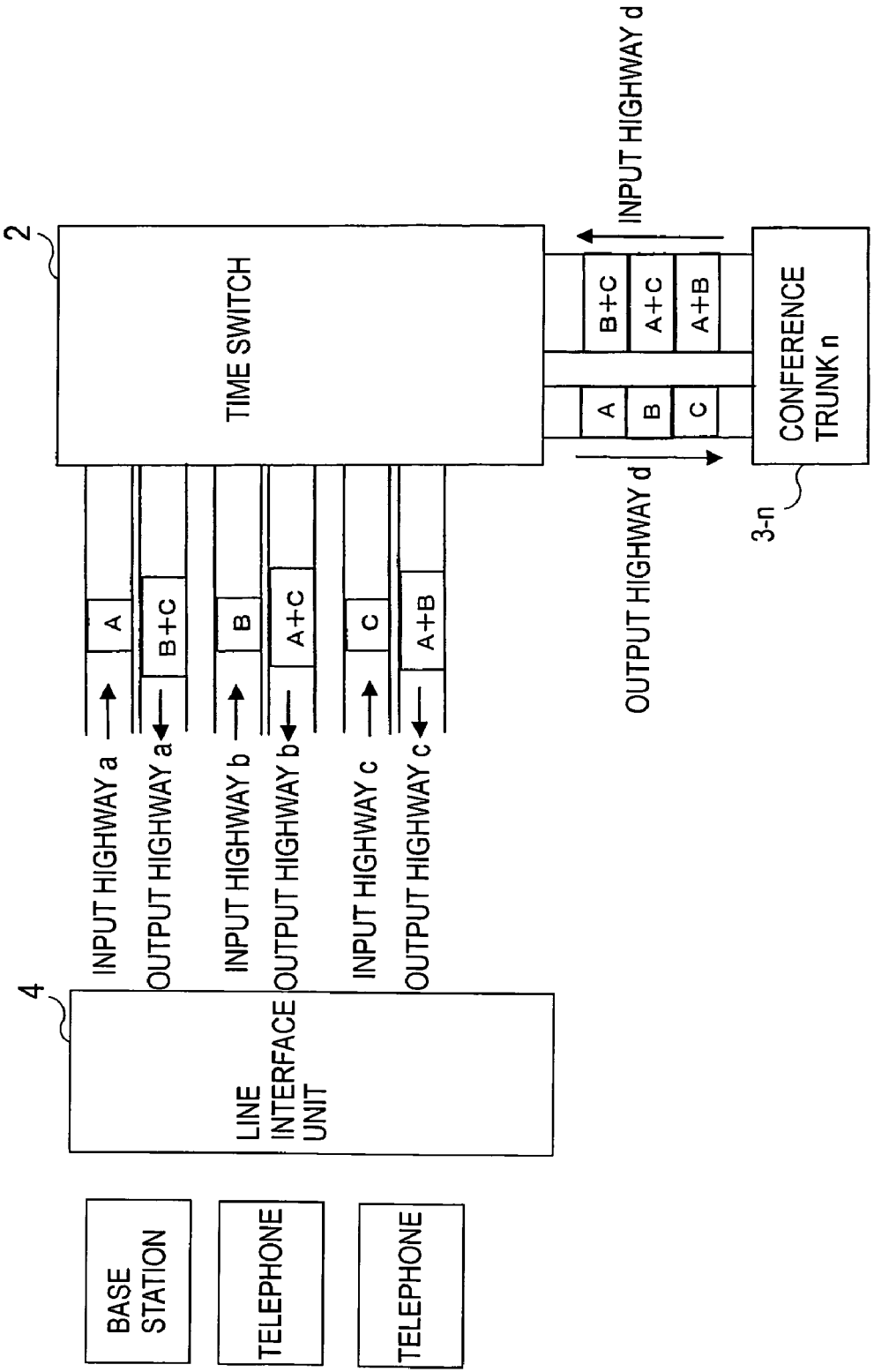
FIG. 27 is a schematic explanatory diagram of a voice highway for a conventional group call.
Figure 28:
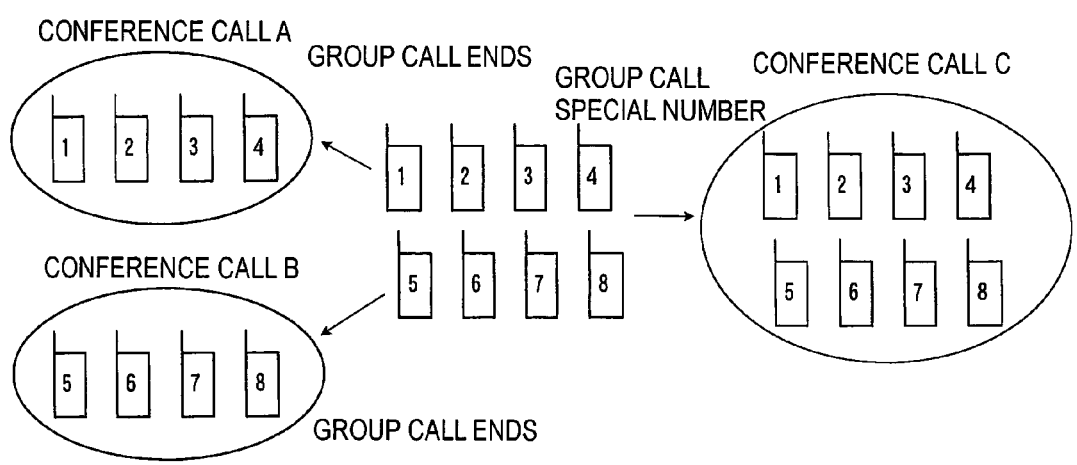
FIG. 28 is a schematic explanatory diagram showing a method for talking together among plural group calls in a conventional telephone system.

Then, similarly to the conventional telephone system illustrated in FIG. 27, in the small-conference trunk (1), voice data A, B and C input from the output highways are synthesized to create the synthesis voices of "B+C" "A+C" and "A+B", which are output to the time slots in the input highways corresponding to the A, B and C, respectively.

Similarly in the small-conference trunk (2), the voice data D, E and F input from the output highways are synthesized to create the synthesis voices of "E+F" "D+F" and "D+E", which are output to the time slots of the input highways corresponding to the D, E and F, respectively.

Notably, for easy understanding, FIG. 4 illustrates a large-conference trunk. However, at the current state, the large-conference trunk has not been created in the conference trunk creating unit 30.

Figure 5:
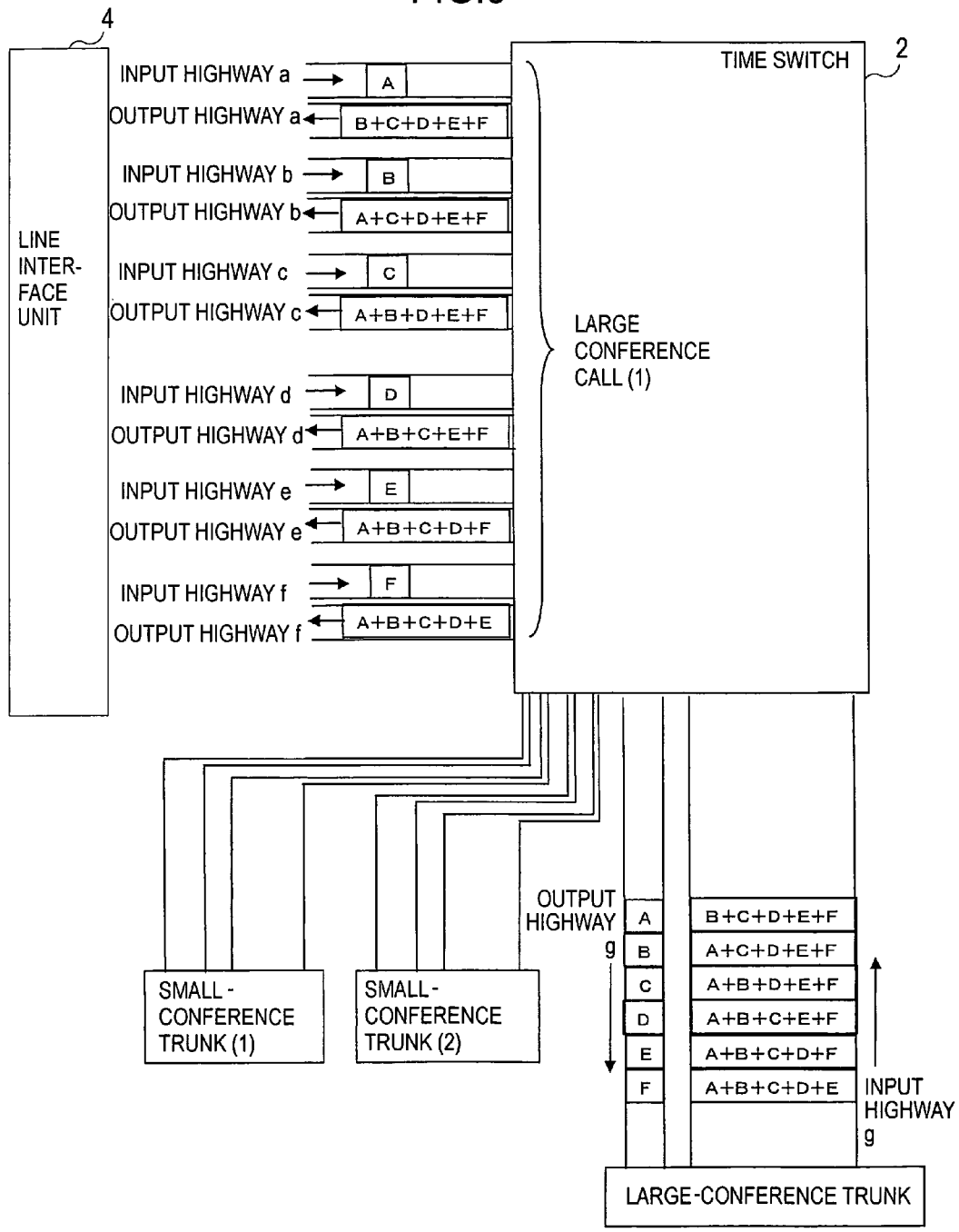
FIG. 5 is a schematic explanatory diagram illustrating a state of voice highways for group calls after multiplexing.

[State after Multiplexing: FIG. 5]

The state after multiplexing will be described with reference to FIG. 5. FIG. 5 is a schematic explanatory diagram illustrating a state of voice highways for group calls after multiplexing.

If, at the state in FIG. 4, one of the participating members inputs the group-call-multiplexing special number corresponding to a pair of the group call (1) and group call (2), the control unit 1 issues the instruction, whereby a large-conference trunk (1) is created in the conference trunk creating unit 30. Further in accordance with the instruction from the control unit 1, the time switch 2 connects the voice on the input highways for the group call (1) and group call (2) to an output highway g for the large-conference trunk (1).

In other words, the control unit 1 switches and connects the participating members of the group call (1) and group call (2) from the small-conference trunks (1) and (2) to the large-conference trunk (1).

The large-conference trunk (1) synthesizes the voice data A, B, C, D, E and F input from the output highway g to create the synthesis voices of "B+C+D+E+F", "A+C+D+E+F", "A+B+D+E+F", "A+B+C+E+F", "A+B+C+D+F" and "A+B+C+D+E", which are then output to the time slots of the input highway g corresponding to A, B, C, D, E and F.

Then, the time switch 2 outputs the voice data from the input highway g to the output highways a to f in every time slot. Thus, the large group call (1) (which is the "large conference call (1)" in FIG. 4) is provided.

In this way, group calls are multiplexed.

Notably, after the multiplexing (or after the connection is switched to the large-conference trunk), in accordance with the instruction from the control unit 1, the small-conference trunk (1) and small-conference trunk (2) are deleted from the conference trunk creating unit 30.

The first system has a feature that the number of participating members of the large group call (1) can be recognized in the large-conference trunk (1). Thus, since the voice level and/or voice quality can be adjusted in accordance with the number of participants, the exactly same processing for voice adjustment within one group call as in the conventional systeps can be used for optimum voice adjustment.

[Group Call Management Table/FIG. 6]

Next, tables provided in the control unit 1 of the first system will be described.

First of all, a group call management table will be described with reference to FIG. 6. FIG. 6 is a schematic explanatory diagram of the group call management table.

As illustrated in FIG. 6, the group call management table is used for storing fundamental information on a group call and stores the corresponding group call special number and belonging members for each group number ("MEMBER" in FIG. 6). The group call management table is pre-registered. The group call special number corresponds to the unique number of a group call according to an embodiment of the invention.

In the example in FIG. 6, a group call special number #10 is stored in association with the group number 1, and members for performing a group call are further stored. The illustrated numbers have been given for convenience, without limiting thereto.

Notably, unlike the conventional systems, the first system creates a conference trunk when a group call special number is called. For that reason, no conference trunks corresponding to group call special numbers are stored therein.

If a group call special number is called, the control unit 1 instructs the conference trunk creating unit 30 to create a small-conference trunk, calls up the group call special number corresponding to the member and controls the time switch 2 so as to connect to the created small-conference trunk having the member according to the call-up.

[Small-Conference Trunk Management Table/FIG. 7]

FIG. 7 is a schematic explanatory diagram of a small-conference trunk management table.

The small-conference trunk management table is a feature of the first system and is created by the control unit 1 if a member calls a group call special number.

More specifically, as illustrated in FIG. 7, a small-conference trunk No., the number of assigned people (or the number of time slots) and the corresponding group call special number (or group number) are stored in association.

In the first system, if a group call special number is called, the control unit 1 causes the conference trunk creating unit 30 to create a small-conference trunk and stores, in the small-conference trunk management table, the number of the small-conference trunk, the called group call special number and the participating members (special-number operator and the member or members responding to the call) in association. Instead of the participating members, the participation or no participation of all members of the group on the group call management table in FIG. 6 may be stored.

In the example in FIG. 7, the group call of the group call special number #10 is connected to the small-conference trunk No. 1, and the group call of the group call special number #20 is connected to the small-conference trunk No. 2.

Notably, the small-conference trunk management table is a temporary table created when a group call starts. When a group call is not performed, the small-conference trunk management table is not created. When a group call ends, the information corresponding to the group call is deleted.

[Multiplexing/Demultiplexing Special Number Table/FIG. 8]

FIG. 8 is a schematic explanatory diagram of a multiplexing/demultiplexing special number table.

The multiplexing/demultiplexing special number table is a feature of the first system and predefines a special number for performing an operation of multiplexing or demultiplexing among group calls. That is, the multiplexing/demultiplexing special number table predefines a special number for multiplexing or demultiplexing for combinations of group calls expected to multiplex or demultiplex.

As illustrated in FIG. 8, a multiplexing special number, a demultiplexing special number and an applicable group call special number are stored in association with a large group call to be created by multiplexing. The multiplexing special number corresponds to the multiplex request according to an embodiment of the invention, and the demultiplexing special number corresponds to the demultiplex request according to an embodiment of the invention.

In the example in FIG. 8, the multiplexing special number #512, demultiplexing special number #612, and the applicable group call special numbers #10 and #20 are stored in association.

In other words, after the group calls of the group call special numbers #10 and #20 start, if one of the members inputs the multiplexing special number #512, the control unit 1 refers to the multiplexing/demultiplexing special number table, multiplexes the group calls of the group call special numbers #10 and #20 and starts the large group call.

Conversely, after the large group call of the multiplexing special number #512 start, if one of the members inputs the demultiplexing special number #612, the control unit 1 refers to the multiplexing/demultiplexing special number table, demultiplexes the large group call into the group calls of the group call special numbers #10 and #20 and starts the group calls.

[Large-Conference Trunk Management Table/FIG. 9]

FIG. 9 is a schematic explanatory diagram of a large-conference trunk management table.

The large-conference trunk management table is a table created by the control unit 1 when a multiplexing special number is input and a large group call is started.

More specifically, as illustrated in FIG. 9, the large-conference trunk management table stores a large-conference trunk No., a multiplexing special number (or large conference number), and a participating member in association. The information on the participating member is read and stored by the control unit 1 from the small-conference trunk management table when group calls are multiplexed.

In the first system, with reference to the large-conference trunk management table and the multiplexing/demultiplexing special number table illustrated in FIG. 8, the control unit 1 can recognize which group calls have been multiplexed and connected to which large-conference trunk. Thus, the control unit 1 can further recognize before demultiplexing processing to which group calls the designated large group call is to be demultiplexed.

The multiplexing/demultiplexing processing on a group call or group calls in the control unit 1 will be described later.

Figure 10:
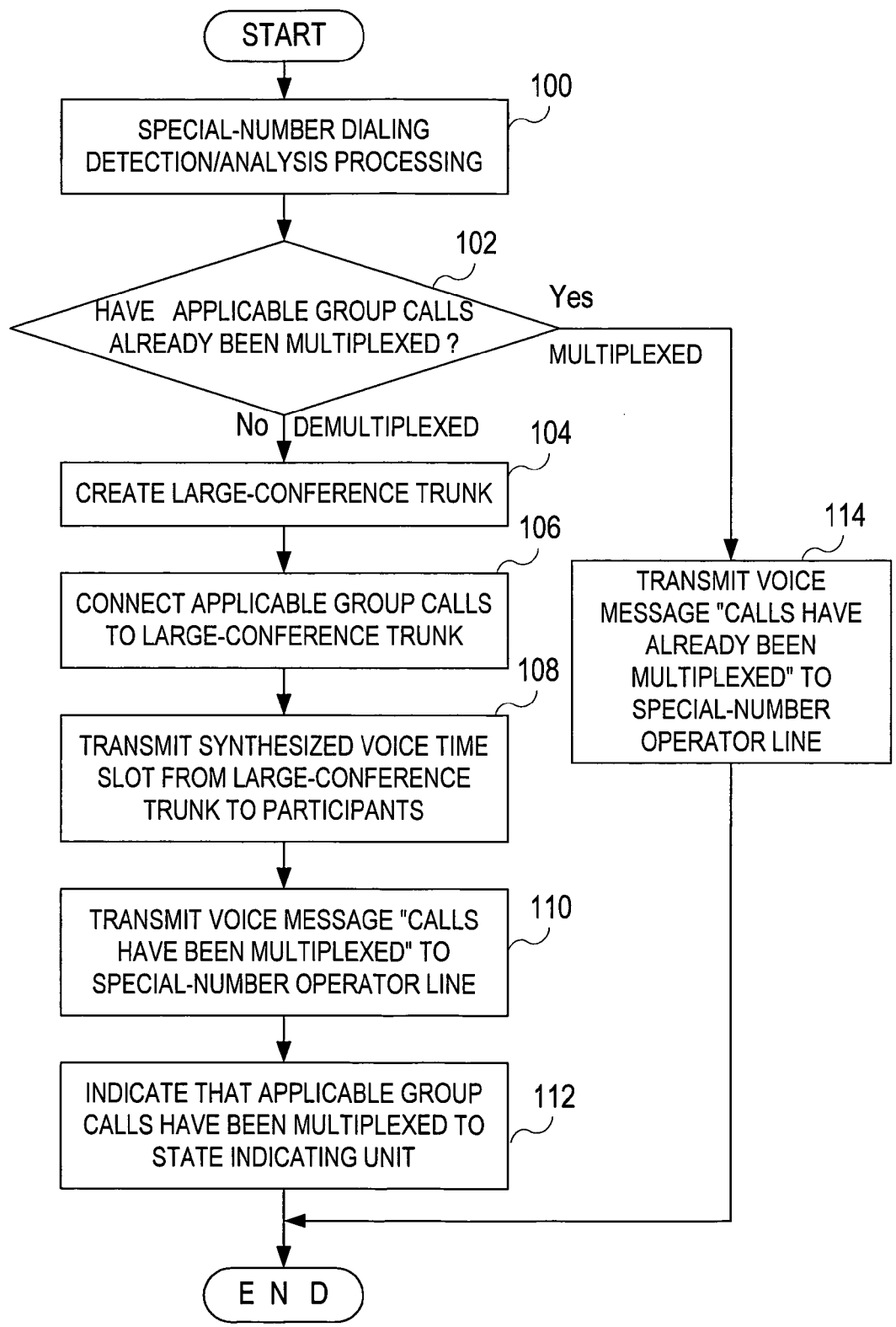
FIG. 10 is a flowchart illustrating processing for multiplexing group calls in the first system.

[Processing in Multiplexing Group Calls/FIG. 10]

Next, the processing by the control unit 1 for multiplexing group calls in the first system will be described with reference to FIG. 10. FIG. 10 is a flowchart illustrating processing for multiplexing group calls in the first system.

As illustrated in FIG. 10, when plural group calls have been started, the control unit 1 performs special-number-dialing detecting processing including monitoring which member inputs a multiplexing special number illustrated in FIG. 8. In response to the input, the control unit 1 detects the input of a multiplexing special number (100).

The control unit 1 then refers to the large-conference trunk management table and determines whether the group calls corresponding to the multiplexing special number have already been multiplexed or not (that is, whether the multiplexing special number is on the large-conference trunk management table or not) (102). If they have already been multiplexed, the voice message "the group calls have already been multiplexed" is output from the voice message output means 6 through the time switch 2 to the line of the operator for the special number (114), and the processing ends.

If in step 102 the corresponding group calls have not been multiplexed, the control unit 1 causes the conference trunk creating unit 30 to create a large-conference trunk (104). The control unit 1 gives a large-conference trunk No. to the created large-conference trunk, refers to the multiplexing/demultiplexing special number table and connects the group calls corresponding to the multiplexing special number to the created large-conference trunk (106).

The control unit 1 further acquires the data on the participating members corresponding to the group calls from the small-conference trunk management table, and stores the large-conference trunk No., multiplexing special number, and participating members in association on the large-conference trunk management table.

The control unit 1 further deletes the information on the multiplexed group calls from the small-conference trunk management table and deletes the corresponding small-conference trunk from the conference trunk creating unit 30.

As illustrated in FIG. 5, the control unit 1 controls the time switch 2 so as to transmit a synthesis voice time slot from the large-conference trunk to each participant (108).

The control unit 1 instructs the voice message output means 6 to output the voice message "the calls have been multiplexed" to the line of the operator for the special number (110). Here, not only to the special number operator but also to all of the participants, the message "the calls have been multiplexed" may be output.

The control unit 1 causes the state indicating unit 7 to indicate that the target group calls are multiplexed into the large group call (112), and the processing ends. In this way, the processing for multiplexing group calls in the first system is performed.

Figure 11:
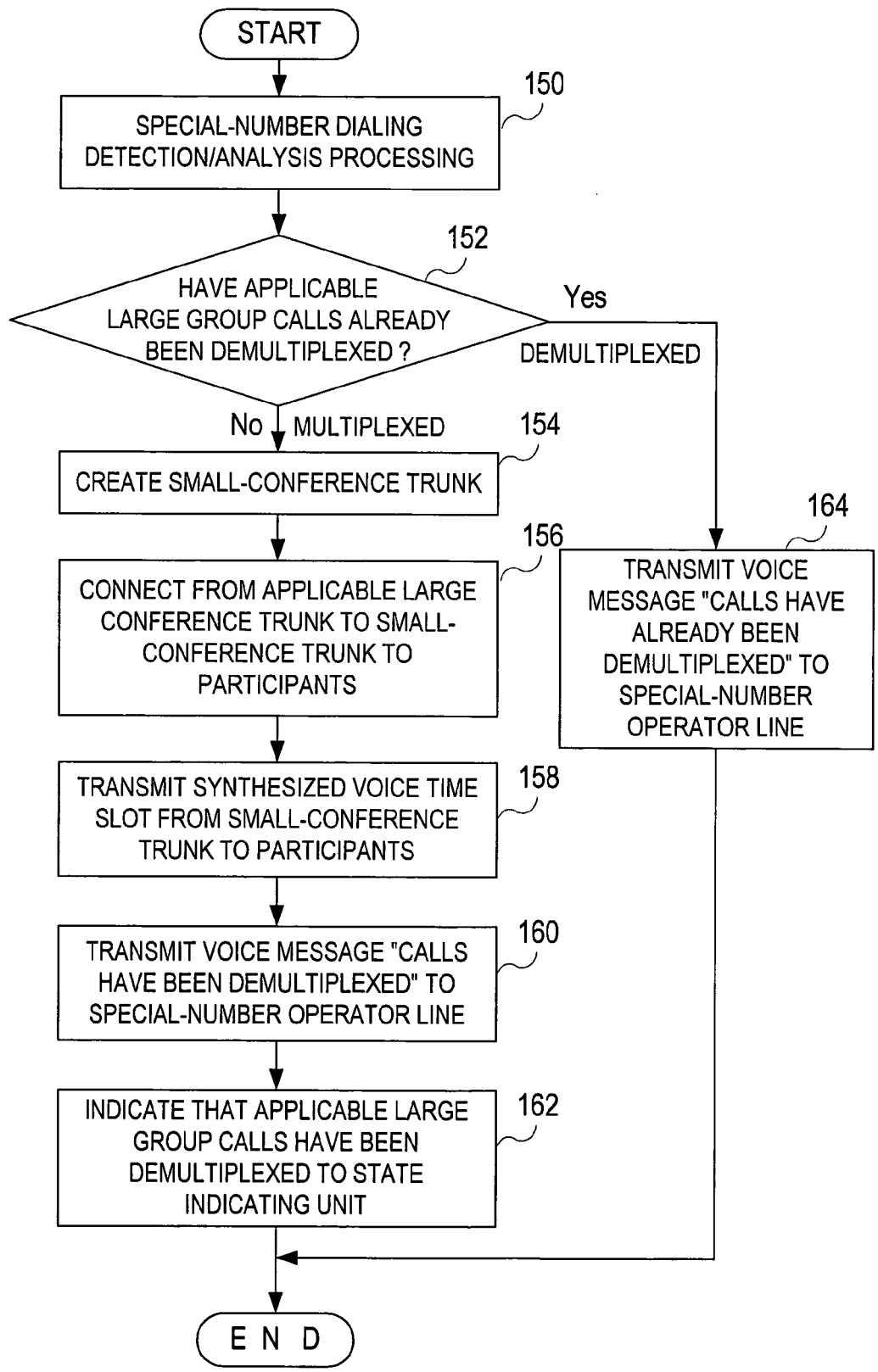
FIG. 11 is a flowchart illustrating processing by a control unit 1 for demultiplexing a multiplexed group call.

[Processing for Demultiplexing Multiplexed Group Call/FIG. 11]

Next, processing by the control unit 1 for demultiplexing a multiplexed group call will be described with reference to FIG. 11. FIG. 11 is a flowchart illustrating processing by the control unit 1 for demultiplexing a multiplexed group call.

As illustrated in FIG. 11, when a multiplexed large group call has been start, the control unit 1 performs the special-number-dialing detecting processing including monitoring whether one member inputs a demultiplexing special number illustrated in FIG. 8 or not. If it is input, the control unit 1 detects the input of the demultiplexing special number (150).

The control unit 1 then refers to the multiplexing/demultiplexing special number table and large-conference trunk management table and determines whether the large group call in the multiplexing special number corresponding to the demultiplexing special number have already been demultiplexed or not (152). If the multiplexing special number corresponding to the demultiplexing special number is not on the large-conference trunk management table, it is determined that the call has already been demultiplexed.

If in step 152 the corresponding large group call has already been demultiplexed, the control unit 1 causes the voice message output means 6 to output the voice message indicating the demultiplexed state, "the call has already been demultiplexed", to the line of the operator for the special number (164), and the processing ends.

If in step 152 the corresponding large group call has not already been demultiplexed, the control unit 1 refers to the multiplexing/demultiplexing special number table, checks the number of the group calls to be created by the demultiplexing, causes the conference trunk creating unit 30 to create the required number of small-conference trunks (154), associates the group calls corresponding to the demultiplexing special number to the created small-conference trunk, and connects the large-conference trunk to the small-conference trunks (156). The small-conference trunks created in step 154 corresponds to a conference trunk for demultiplexing according to an embodiment of the invention.

The control unit 1 then deletes the large-conference trunk and deletes and updates the information on the corresponding large group call from the large-conference trunk management table. The control unit 1 further updates the small-conference trunk table.

The control unit 1 then controls the time switch 2 so as to transmit the synthesis time slots from the small-conference trunks to the participants (158).

The control unit 1 then outputs the voice message "the call has been demultiplexed" to the line of the operator for the special number (160). Here, not only to the special number operator but also to all of the participants, the voice message may be output.

The control unit 1 causes the state indicating unit 7 to indicate that the large-conference trunk has been demultiplexed to the group calls (162), and the processing ends. In this way, the processing for demultiplexing a group call in the first system is performed.

In order to demultiplex a large group call resulting from the multiplexing of two group call, the control unit 1 may cause the conference trunk creating unit 30 to create one small-conference trunk. In this case, the control unit 1 connects one group call of the two group calls to the newly created small-conference trunk and keeps the other group call to the large-conference trunk for group calling. In other words, in this case, the control unit 1 uses the conference trunk created as the large-conference trunk as a small-conference trunk.

[Multiplexing Operation with Contact Input]

In the first system, in response to the input from the contact input unit 53, the multiplexing or demultiplexing operation may be performed alternatively.

For example, an external panel on which a contact is to be input may be connected to the contact input unit 53, and an operator may perform an input operation thereon. The contact supports a paging line (such as a microphone and a speaker), and a voice signal is input/output, like a microphone and speaker of a wired telephone or the like.

[Multiplexing/Demultiplexing Special Number Table with Contact Input/FIG. 12]

A multiplexing/demultiplexing special number table with a contact input will be described with reference to FIG. 12. FIG. 12 is a schematic explanatory diagram of the multiplexing/demultiplexing special number table with contact input.

The multiplexing/demultiplexing special number table with contact input is a table defining the association between contact inputs and multiplexing special number or demultiplexing special numbers illustrated in FIG. 8.

As illustrated in FIG. 12, the multiplexing/demultiplexing special number table stores a contact number and a multiplexing special number or demultiplexing special number in FIG. 8 corresponding thereto and further stores the corresponding paging line.

Figure 13:
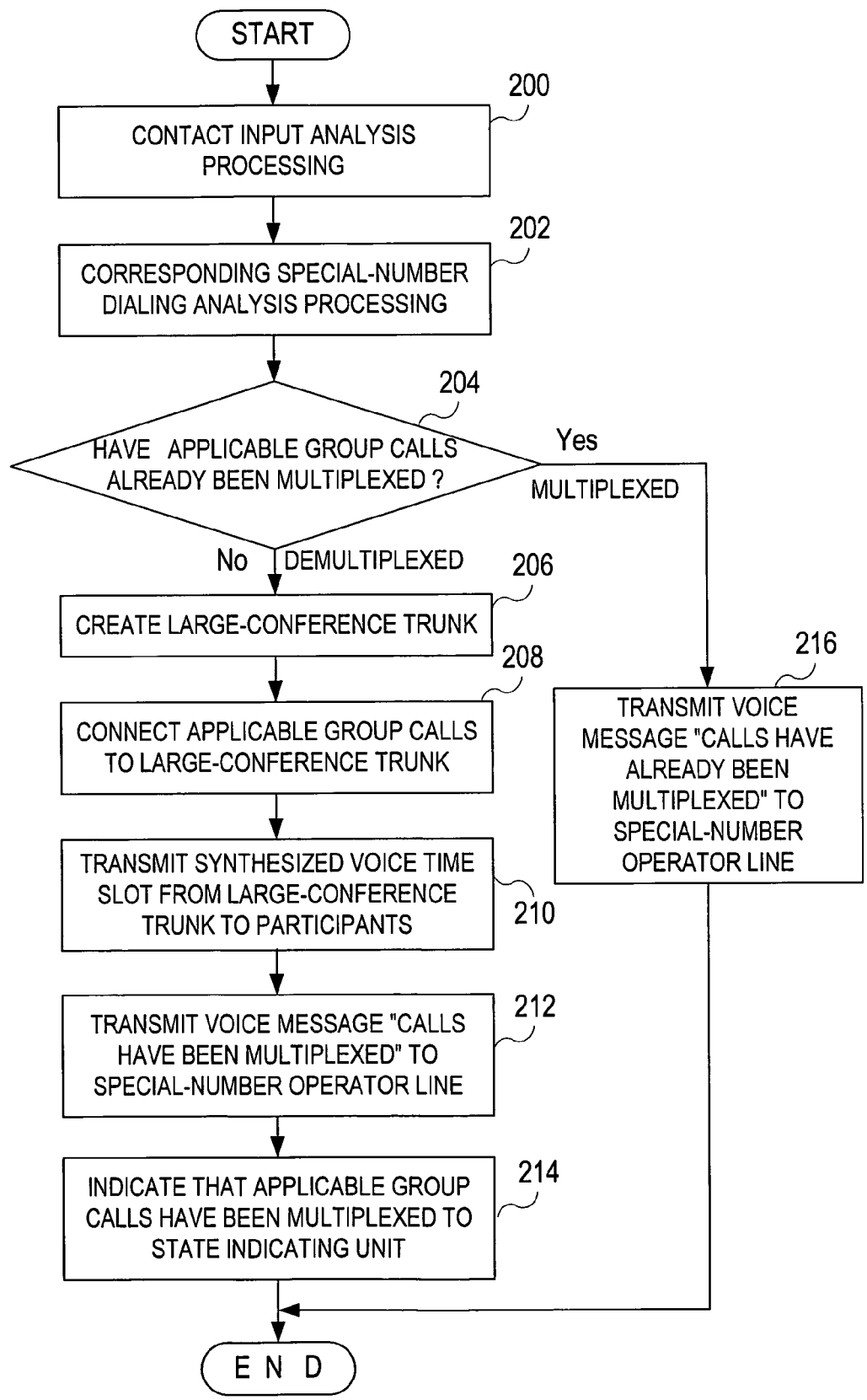
FIG. 13 is a flowchart illustrating processing of group call multiplexing with a contact operation.

[Processing of Group Call Multiplexing by Contact Operation/FIG. 13]

Next, processing of group call multiplexing by a contact operation will be described with reference to FIG. 13. FIG. 13 is a flowchart illustrating processing of group call multiplexing with a contact operation.

As illustrated in FIG. 13, after plural group calls start, if the control unit 1 performs contact input analysis processing and detects a contact input from the contact input/output unit 53 (200), the control unit 1 performs the corresponding special number dialing analysis processing including referring to the multiplexing/demultiplexing special number table with contact input illustrated in FIG. 12 and reads the multiplexing special number corresponding to the input contact (202).

Then, the control unit 1 performs in and after processing 204 the same processing as the one to be performed when the multiplexing special number is called and input. In other words, since steps 204 to 216 in FIG. 13 are exactly the same as steps 102 to 114 illustrated in FIG. 10, the description will be omitted.

In this way, the contact operation is performed to multiplex group calls.

Figure 14:
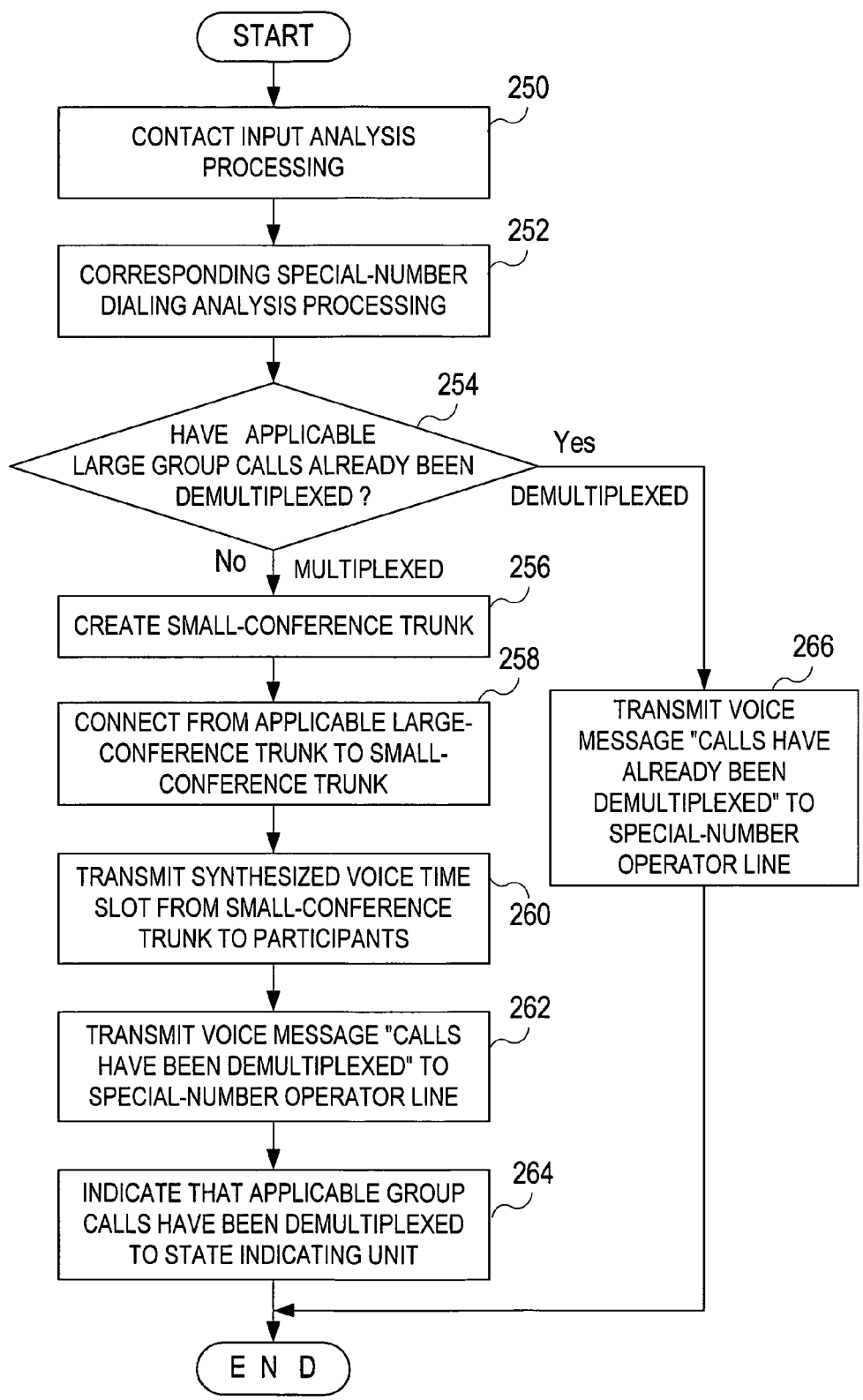
FIG. 14 is a flowchart illustrating processing of demultiplexing a large group call with a contact operation.

[Processing of Demultiplexing Large Group Call with Contact Operation/FIG. 14]

Next, processing of demultiplexing a large group call with a contact operation will be described with reference to FIG. 14. FIG. 14 is a flowchart illustrating processing of demultiplexing a large group call with a contact operation.

As illustrated in FIG. 14, after a multiplexed large group call starts, if the control unit 1 performs contact input analysis processing to detect a contact input from the contact input/output unit 53 (250), the control unit 1 performs the special number dialing analysis processing including referring to the multiplexing/demultiplexing special number table with contact input illustrated in FIG. 12 and reads the demultiplexing special number corresponding to the input contact (252).

The control unit 1 then performs, after step 252, the same processing as the one to be performed when the demultiplexing special number is dialed and input. In other words, since steps 254 to 266 in FIG. 14 are exactly the same as step 152 to 164 illustrated in FIG. 11, the description will be omitted.

In this way, a group call is demultiplexed with a contact operation.

[Indication Examples in First System/FIG. 15]

Next, indication examples by the state indicating unit 7 in the first system will be described with reference to FIG. 15. FIG. 15 is a schematic explanatory diagram illustrating indication examples by the state indicating unit 7 in the first system.

In the first system, every time group calls are multiplexed or a group call is demultiplexed, the multiplexed or demultiplexed state is indicated by the state indicating unit 7.

As illustrated in FIG. 15, the state indicating unit 7 indicates a group list corresponding to a multiplexing special number and a demultiplexing special number (group number corresponding to "applicable group call special number" on the multiplexing/demultiplexing special number table illustrated in FIG. 8), the current state and an entrant indication button.

The example in FIG. 15 illustrates that, with the multiplexing special number #523, the group calls of the group number 2 and 3 are multiplexed to start a large group call. Other large group calls are not started there.

When the "entrant indication" button is clicked, the information (entry state) including the unique numbers (or Nos.), names of terminals capable of participating and participation/no-participation of the terminals for the group call with group Nos. 2 and 3, which are participating in the large group call is indicated in a lower part of the screen.

Thus, an operator who manages or maintains the system can grasp the state of multiplexing on group calls at the current point in time and information on the participants, which improves the convenience.

The control unit 1 provides the indications by referring to the internally stored group call management table, small-conference trunk management table, large-conference trunk management table and multiplexing/demultiplexing special number table, extracting required information, integrating it to screen data and outputting the result to state indicating unit 7.

Advantages of First Embodiment

The telephone system according to the first embodiment of the invention includes the conference trunk creating unit 30 that creates a conference trunk as required and stores a multiplexing special number and demultiplexing special number corresponding to plural group calls onto the multiplexing/demultiplexing special number table. When plural group calls have been start and if the multiplexing special number is input, the control unit 1 causes the conference trunk creating unit 30 to create a large-conference trunk, connects all of the voices of the plural group call corresponding to the multiplexing special number to a large-conference trunk to create a large group call. If the demultiplexing special number is input, the control unit 1 causes the conference trunk creating unit 30 to create plural small-conference trunks and connects each of the group calls corresponding to the demultiplexing special number to the corresponding small-conference trunks to demultiplex from the large-conference trunk. Thus, a small-conference trunk or large-conference trunk may be created as required, and the connection among participants may be changed. Therefore, voice synthesis processing may be performed in accordance with multiplexing or demultiplexing of group calls or a group call flexibly. Furthermore, in the large-conference trunk, voice level and/or voice quality of the group calls are adjusted as one conference trunk in the same manner as in the past. Thus, the voice of the large group call created by multiplexing may be adjusted in an optimum manner. A user may perform a simple operation to multiplex or demultiplex among group calls, which can advantageously improve the convenience.

With the first system, the state of a large group call created by multiplexing group calls and participants can be indicated by the state indicating unit 7 serving as a maintenance terminal, which can advantageously improve the convenience.

With the first system, when a multiplexing or demultiplexing operation is performed, the multiplexed or demultiplexed state can be informed from the voice message output means 6 to the participants of the corresponding group call or group calls. Thus, the participants can grasp under which state the current call is being performed.

Second Embodiment

Next, a telephone system (which will be called second system) according to a second embodiment of the invention will be described.

Since the configuration of the second system is fundamentally the same as the configuration of the first system illustrated in FIG. 1, the description will be omitted. However, they are different in the processing in the control unit 1. Particularly, the second system is different from the first system in the usage of a special number relating to multiplexing or demultiplexing group calls or a group call.

Also in the second system, no conference trunks for voice synthesis are fixedly provided. The conference trunk creating unit 30 creates a small-conference trunk or large-conference trunk, as required in accordance with the instruction by the control unit 1.

The second system has fundamentally the same tables regarding the implementation of a group call or group calls and multiplexing and/or demultiplexing thereon as those in the first system.

In the first system, a multiplexing special number or a demultiplexing special number is determined in accordance with a preset combination of specific group calls. The second system on the other hand has a multiplexing special number and demultiplexing special number for inputting a multiplex instruction and demultiplex instruction.

After plural group calls start, if one member inputs a combination of a multiplexing special number and the group call special number of another group call, the group call having the member having performed the operation and the input group call are multiplexed thereby.

If a demultiplexing special number and the group call special number of a specific group call are input, the specific group call is demultiplexed from the group calls.

Thus, in the second system, a combination of a multiplexing special number and the corresponding group calls need not be prestored in association. Currently desirable group calls or group call may be multiplexed or be demultiplexed, as required, which can improve the convenience.
[Group Call Management Table and Special Number/FIGS. 16A and 16B]

With reference to FIGS. 16A and 16B, a group call management table and a special number in the second system will be described below. FIG. 16A is a schematic explanatory diagram of a group call management table in the second system, and FIG. 16B is examples of the special numbers. Notably, the numbers are given for convenience of description, without limiting thereto.

As illustrated in FIG. 16A, the group call management table of the second system stores a group name, a group call special number and a member in association, like the first system.

In the example in FIG. 16A, a group A has a group call special number 90 and members 1, 2, 3, and 4, and a group B has a group call special number 91 and members 5, 6, 7, and 8. The group call special number of the group (A+B) is 92, and the members are 1, 2, 3, 4, 5, 6, 7, and 8.

As illustrated in FIG. 16B, the group-call-multiplexing special number is set to 95, and the group-call-demultiplexing special number is set to 96.
[Schematic Processing for Multiplexing Group Calls/FIG. 17]

Next, with reference to FIG. 17, schematic processing for multiplexing group calls in the second system will be described. FIG. 17 is a flowchart illustrating schematic processing for multiplexing group calls in the second system. The processing will be described specifically by using the special numbers on FIGS. 16A and 16B.

As illustrated in FIG. 17, if the special number 90 is input, the control unit 1 starts the group call A. If the special number 91 is input, the control unit 1 starts the group call B (300). The creation of a small-conference trunk for starting a group call and the update on the small-conference trunk management table are performed in the same manner as in the first system.

If a member of the group call B inputs the multiplexing special number 95+the special number 90 of the group call A or if a member of the group call A inputs the multiplexing special number 95+the special number 91 of the group call B (302), the control unit 1 causes the conference trunk creating unit 30 to create a large-conference trunk, connects the participants (or participating members) of the group call A and the participants of the group call B to the large-conference trunk and multiplexes the group call A and group call B (304).

Notably, the "group-call-multiplexing special number+group call special number" in the second system corresponds to a "multiplex request" according to an embodiment of the invention.

The update on the large-conference trunk management table for group call multiplexing is performed in the same manner as in the first system, and a large-conference trunk, plural group calls and participants are in association.

In this way, the processing for multiplexing is performed.
[Schematic Processing for Demultiplexing Group Calls/FIG. 18]

Next, processing for demultiplexing a group call in the second system will be described schematically with reference to FIG. 18. FIG. 18 is a flowchart illustrating schematic processing for demultiplexing a group call in the second system. The processing will be described more specifically by using the special numbers in FIGS. 16A and 16B.

As illustrated in FIG. 18, after the special number 92 is input and the group call (A+B) is thus started (350), if the demultiplexing special number 96+the special number 90 of the group call A or the demultiplexing special number 96+the special number 91 of the group call B is input (352), the control unit 1 causes to create a new small-conference trunk, separates the group call A or B corresponding to the special number input along with the demultiplexing special number from the group call (A+B) and connects the group call to the created small-conference trunk (354). The group call which has not been separated is kept connected to the original conference trunk.

Thus, the separated group call and the remaining group call are connected to different conference trunk and are demultiplexed. Notably, the "group-call-demultiplexing special number+group call special number" in the second system corresponds to a "demultiplex request" according to an embodiment of the invention.

The second system has a feature that a group call to be demultiplexed is not limited to a large group call resulting from multiplexing but may be a normal group call.

[Conference Trunk in Multiplexing/FIGS. 19A to 19D]

Next, with reference to FIG. 19A to 19D, the states of conference trunks in multiplexing in the second system will be described. FIGS. 19A to 19D are schematic explanatory diagrams illustrating the states of conference trunks in multiplexing in the second system. Notably, the numbers are given for convenience of description, without limiting thereto.

As illustrated in FIG. 19A, when the group call special number 90 is used to start the group call A, the conference trunk creating unit 30 creates the small-conference trunk (90), the participating members 1, 2, and 3 of the group call special number 90 (of the group call A) are connected thereto. This state is stored on the small-conference trunk management table in the control unit 1.

Similarly, as illustrated in FIG. 19B, when the group call special number 91 is used to start the group call B, the conference trunk creating unit 30 creates another small-conference trunk (91), and the participating members 5, 6, and 7 of the group call special number 91 (of the group call B) are connected thereto.

As illustrated in FIG. 19C, if the member 1 inputs the multiplexing special number 95 and the group call special number 91 of the group call B, the conference trunk creating unit 30 creates a large-conference trunk 100. Then, the participating member 1, 2, and 3 of the group call special number 90 (of the group call A) and the participating member 5, 6, and 7 of the group call special number 91 (of the group call B) are connected to the large-conference trunk 100. Thus, the two group calls are multiplexed.

As illustrated in FIG. 19D, the control unit 1 manages the multiplexed conditions on a multiplex table. The multiplex table stores a large group call number, a large-conference trunk number, and a group call special number in multiplexing in association.

The multiplex table corresponds to the large-conference trunk management table in the first system.

In the example in FIG. 19D, the large group call number 100 represents the multiplexed group call special number 90 (of the group call A) and group call special number 91 (of the group call B).

The second system has a feature that a large group call number and plural group calls are not fixedly associated, but the input of a multiplexing special number causes to create a large-conference trunk for plural group calls, and the control unit 1 stores the association on the multiplex table when the plural group calls are multiplexed.

[Conference Trunk in Demultiplexing Unmultiplexed Group Call/FIGS. 20A to 20C]

Next, the state of an unmultiplexed conference trunk in demultiplexing in the second system will be described with reference to FIGS. 20A to 20C. FIGS. 20A to 20C are schematic explanatory diagrams illustrating the states of conference trunks in demultiplexing an unmultiplexed group call in the second system.

As illustrated in FIG. 20A, when, for example, the group call special number 92 is used to start the group call (A+B), the conference trunk creating unit 30 creates a small-conference trunk 92, and the members 1, 2, 3, 5, 6, and 7 of the group call special number 92 (of the group call A+B) are connected thereto. This state is stored on the small-conference trunk management table by the control unit 1. The group call (A+B) started with the group call special number 92 is originally one group call, not one created by multiplexing group calls.

If one member inputs the demultiplexing special number 96 and the special number 90 of the group call A, the control unit 1 performs processing for demultiplexing the group call A from the original group call.

In other words, as illustrated in FIG. 20B, the control unit 1 causes the conference trunk creating unit 30 to create another small-conference trunk 90, refers to the group call management table illustrated in FIG. 16A, and identifies the members 1, 2 and 3 of the group call A among the members in the group call (A+B). Then, the control unit 1 associates the group call A with the newly created small-conference trunk, connects the members 1, 2, and 3 of the group call A thereto, and demultiplexes the group call A from the original group call (A+B). Here, the newly created small-conference trunk corresponds to a conference trunk for demultiplexing according to an embodiment of the invention.

Thus, as illustrated in FIG. 20C, in the small-conference trunk 92 for the original group call (A+B), the remaining members 5, 6, and 7 of the group call B only perform the group call. The control unit 1 updates the small-conference trunk management table in accordance with the processing.

In this way, an unmultiplexed group call in the second system is demultiplexed.

[Conference Trunk in Demultiplexing Multiplexed Group Call/FIGS. 21A to 21C]

Next, with reference to FIGS. 21A to 21C, a conference trunk in demultiplexing a multiplexed group call will be described. FIGS. 21A to 21C are schematic explanatory diagrams illustrating conference trunks in demultiplexing a multiplexed group call in the second system.

As illustrated in FIG. 21A, when, for example, the group call A and the group call B have started and if the member 1 inputs the multiplexing special number 95+group call special number 92 to multiplex the group calls A and B, the participating members 1, 2, and 3 of the group call special number 90 (of the group call A) and the participating members 5, 6, and 7 of the group call special number 91 (of the group call B) are connected to the large-conference trunk 100 and are multiplexed to a large group call, as described above.

Then, as illustrated in FIG. 21B and FIG. 21C, if one member inputs the demultiplexing special number 96 and the special number 90 of the group call A, the control unit 1 performs processing for demultiplexing the multiplexed group call in the large-conference trunk 100.

In other words, the control unit 1 refers to a multiplex table to recognize the number of group calls to which the large group call is to be demultiplexed, causes the conference trunk creating unit 30 to create the required number of small-conference trunks, and connects the participating members connecting to the large-conference trunk 100 to the small-conference trunks.

Here, the control unit 1 causes to create two small-conference trunks, connects the members of the group call A to the small-conference trunk (90), as illustrated in FIG. 21B, and connects the members of the group call B to the small-conference trunk (91), as illustrated in FIG. 21C, and demultiplexes the multiplexed group call into the group call A and the group call B.

Then, the large-conference trunk 100 is deleted from the conference trunk creating unit 30, and the corresponding information on the multiplex table is also deleted. In this way, the multiplexed group call is demultiplexed in the second system.

In the example in FIG. 21, if a demultiplexing special number is input after multiplexing, all of the multiplexed group calls are reconnected to small-conference trunks. However, as in FIGS. 20A to 20C, the control may be performed so as to only move the group call corresponding to the group call special number input along with the demultiplexing special number to a newly created small-conference trunk and keep the other group calls in the large-conference trunk.

When two kinds of demultiplexing special numbers are provided and if the demultiplexing special number 96 is input, for example, all group calls participating in the large group call may be moved to small-conference trunk for demultiplexing. If the demultiplexing special number 97 is input, only the group call corresponding to the group call special number input along with the demultiplexing special number may be moved to a small-conference trunk. Thus, in accordance with the form of a conference or the progress of the conference, a large group call may be broken up at a time, or partial groups may only leave the large group call, which can improve the convenience. Notably, in order to move all group calls to the small-conference trunks, the demultiplexing special number may only be required to be input. The demultiplexing special number corresponds to a demultiplex request according to an embodiment of the invention.

[Indication Examples in Second System/FIG. 22]

Next, with reference to FIG. 22, indication examples in the second system will be described. FIG. 22 is an explanatory diagram illustrating indication examples in the second system.

As illustrated in FIG. 22, the state indicating unit 7 (or maintenance terminal) in the second system indicates whether a group call on the group call management table has been started or not and the condition if the group call is multiplexed with another group call. In the example in FIG. 22, the groups A and B, and the groups E and F are multiplexed, and the other group calls are not started.

The lower part of the screen displays operable buttons, which allow an operation on the state indicating unit 7 to multiplex or demultiplex the group calls. More specifically, a desirable group may be selected, and an instruction "start", "multiplex" or "demultiplex" may be input by clicking.

In other words, in accordance with the input through the state indicating unit 7, the control unit 1 performs processing for starting or multiplexing/demultiplexing the group call or group calls, as described above.

Advantages of Second Embodiment

With the telephone system according to the second embodiment, the group-call-multiplexing special number for inputting an instruction to multiplex group calls and the group-call-demultiplexing special number for inputting an instruction to demultiplex a group call are provided. If the group-call-multiplexing special number and the group call special number of the group call which is the other desirable party are input, the control unit 1 creates a large-conference trunk input and connects the source group call and the other group call to the large-conference trunk. Thus, the large group call having the multiplexed input source group call and input group call can be implemented. This may eliminate the necessity for presetting a combination of group calls to be multiplexed. Multiplexing with an arbitrary group call as required is allowed for a conference, or the input of the demultiplexing special number allows easy demultiplexing on the multiplexed group call, which can advantageously improves the convenience.

Third Embodiment

Next, a telephone system (which will be called as third system) according to a third embodiment of the invention will be described.

Since the configuration of the third system is fundamentally the same as the configuration of the first system illustrated in FIG. 1, the description will be omitted. However, the third system and the first system are different in partial processing in the control unit 1.

The third system assumes a "large conference room" in which plural group calls hold a conference together and pre-stores, for each group call, a special number for moving to a large conference room and a special number for returning from a large conference room to a normal group call.

Notably, the third system also has a group call management table and small-conference trunk management table similar to those in the first system.

[Large-Conference-Room Special-Number Table in Third System/FIGS. 23A and 23B]

With reference to FIGS. 23A and 23B, a large-conference-room special-number table in the third system will be described. FIGS. 23A and 23B are explanatory diagrams illustrating examples of the large-conference-room special-number table in the third system.

The control unit 1 of the third system has a large-conference-room special-number table as illustrated in FIG. 23A, which stores a group number, a moving special number to the large conference room corresponding to it, and a special number for returning to a small conference room in association. The "moving special number to a large conference room" in the third system corresponds to a multiplex request according to an embodiment of the invention, and the "special number for returning to a small conference room" corresponds to a demultiplex request according to an embodiment of the invention.

Here, the small conference room is implemented by a small-conference trunk for performing an individual group call, and the large conference room is implemented by a large-conference trunk common to groups 1 to 3. The small conference room and large conference room are both created by the conference trunk creating unit 30 in accordance with the instruction from the control unit 1 as required.

While a group call is being performed, if the moving special number to a large conference room stored in association with a group number is input, the control unit 1 causes to create a large-conference trunk functioning as the large conference room and connects the group call to the large-conference trunk. Thus, the group call moves to the large conference room. When a group call moves to a large conference room but no other group calls move to the large conference room, the group call is kept only by the group 1 as it is.

If a member of another group call inputs the moving special number to the large conference room corresponding to the group number, the control unit 1 connects the other group call to the large-conference trunk. Thus, the group also moves to the large conference room and is multiplexed with the previously moved group call to start a conference together.

In the example in FIGS. 23A and 23B, while the group 1 is performing a group call, if one participant inputs a special number #11, all of the participants of the group call move to the large conference room. Similarly, the group 2 inputs a number #21 to move to the large conference room, and the group 3 inputs a number #31 to move to the large conference room.

In order to leave a large conference room, the special number for returning to a small conference room may be input. Thus, the control unit 1 causes the conference trunk creating unit 30 to create a small-conference trunk functioning as a small conference room and connects the group call corresponding to the input special number to the small-conference trunk. As a result, the group call returns from the large conference room to the small conference room and then restarts the group call.

If there are more groups, the number of conference rooms may be increased, and the group number and the number corresponding to a target conference room may be used in making these movements, as illustrated in FIG. 23B.

For example, for the group 1, the special number of a first conference room (which is "large conference room 1" in FIG. 23B), the special number to move to a second conference room, the special number to move to a third conference room, . . . and the special number to move to a small conference room are predefined as #11, #12, #13 . . . and #19, respectively, and different special numbers are predefined for other groups. Thus, for example, when the groups 3 and 4 are using the first conference room, the group 1 and group 2 may start a conference together in the second conference room.

Also in this case, if a member of the group 3 or 4 inputs a moving special number to the first conference room, the control unit 1 causes to create a large-conference trunk functioning as the first conference room. Then, in accordance with the input of a special number, the control unit 1 connects the groups 3 and 4 to the large-conference trunk functioning as the first conference room to implement the large group call.

The control unit 1 includes a large-conference trunk management table, as a table corresponding to the large-conference trunk management table in the first system, storing a large-conference trunk No., a conference room number, a participating group number, and a participating member. Then, the table may be updated in accordance with the entrance/exit of a group call to/from the large conference room.

If a member of the group 1 inputs #12, the control unit 1 causes to create a large-conference trunk functioning as a second conference room and connects the group 1 to the large-conference trunk functioning as the second conference room.

Without a predetermined combination of group calls, the control allows group calls requiring a joint conference to move to the currently vacant large conference room and implement a large group call, which can greatly improve the convenience.

Like the first and second system, the control unit 1 after moving the connection from a small-conference trunk to a large-conference trunk deletes the small-conference trunk and, after all group calls are moved from a large-conference trunk to small-conference trunks, deletes the large-conference trunk.

Figure 24:
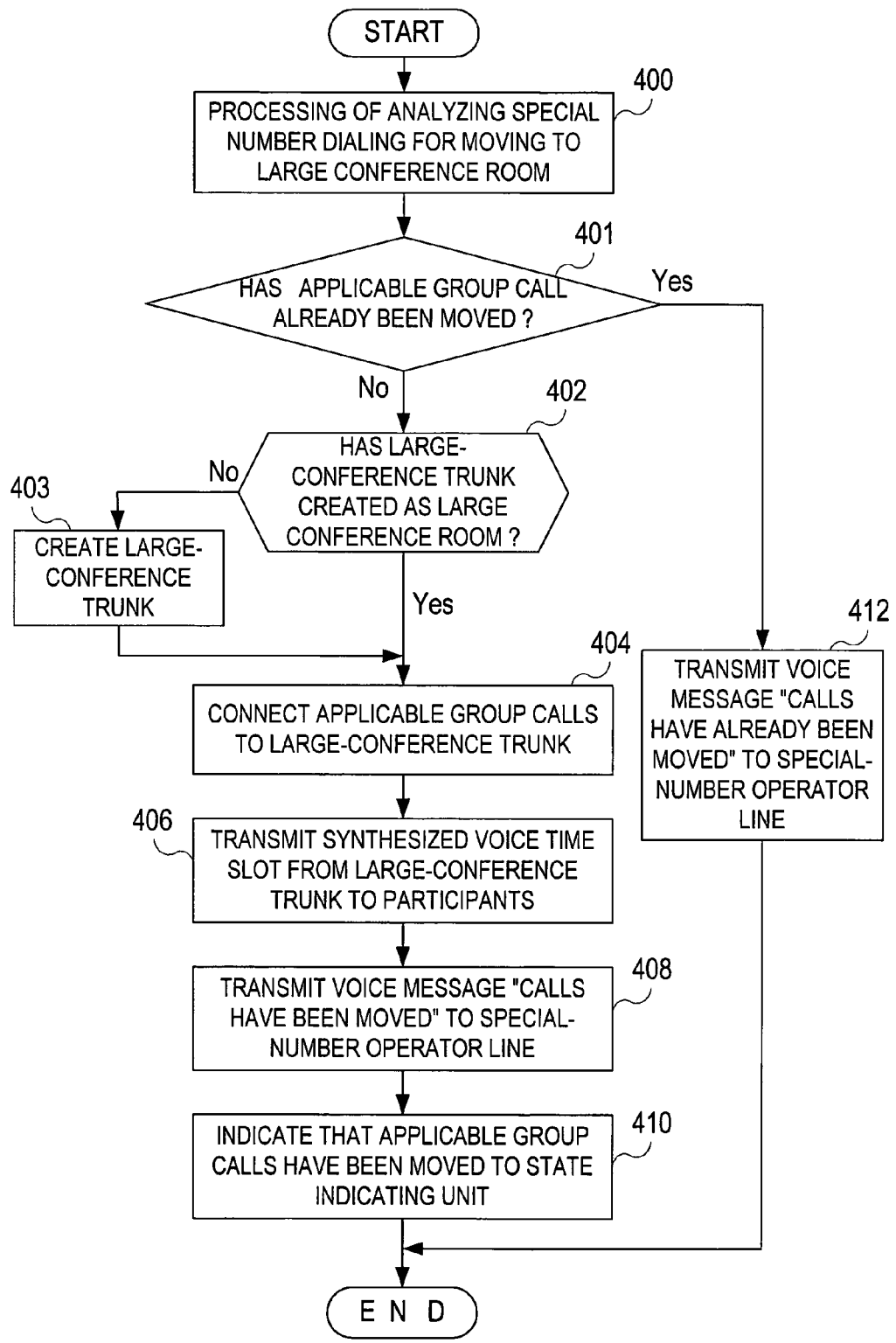
FIG. 24 is a flowchart illustrating processing for moving to a large conference room in the third system.

[Processing for Moving to Large Conference Room in Third System/FIG. 24]

Next, with reference to FIG. 24, processing for moving to a large conference room in the third system will be described. FIG. 24 is a flowchart illustrating processing for moving to a large conference room in the third system.

As illustrated in FIG. 24, when a group call has started, the control unit 1 performs determining whether a moving special number to a large conference room is input or not, as dialing analysis processing on a moving special number to a large conference room, if the input is detected (400), determining whether the group call corresponding to the special number has already moved to the large conference room or not (401), if so, outputting the voice message "the group call has already moved to the large conference room" to a special number operator (412), and ending processing.

If in step 401, the group call has not moved yet to the large conference room, the control unit 1 determines whether the conference trunk creating unit 30 has created a large-conference trunk functioning as the large conference room or not (402).

If in step 402 another group call moves to the large conference room and the large-conference trunk functioning as a large conference room has already been created thereby, the control unit 1 connects the group call to the large-conference trunk (404). Thus, the group call moves to the large conference room and is multiplexed with the group call that has previously moved to implement a large group call.

If in step 402 a large-conference trunk functioning as the large conference room has not created yet, the control unit 1 causes the conference trunk creating unit 30 to create the large-conference trunk (403) and proceeds to step 404.

Then, the control unit 1 deletes the small-conference trunk and controls the time switch 2 so as to transmit the synthesis voice time slot from the large-conference trunk to the participants (406).

The control unit 1 further outputs the voice message "the group call has moved to the large conference room" to the line of the operator for the special number (408) and indicates that the group call has moved to the large conference room in state indicating unit 7 (410). In this way, the processing for moving to a large conference room is performed.

Figure 25:
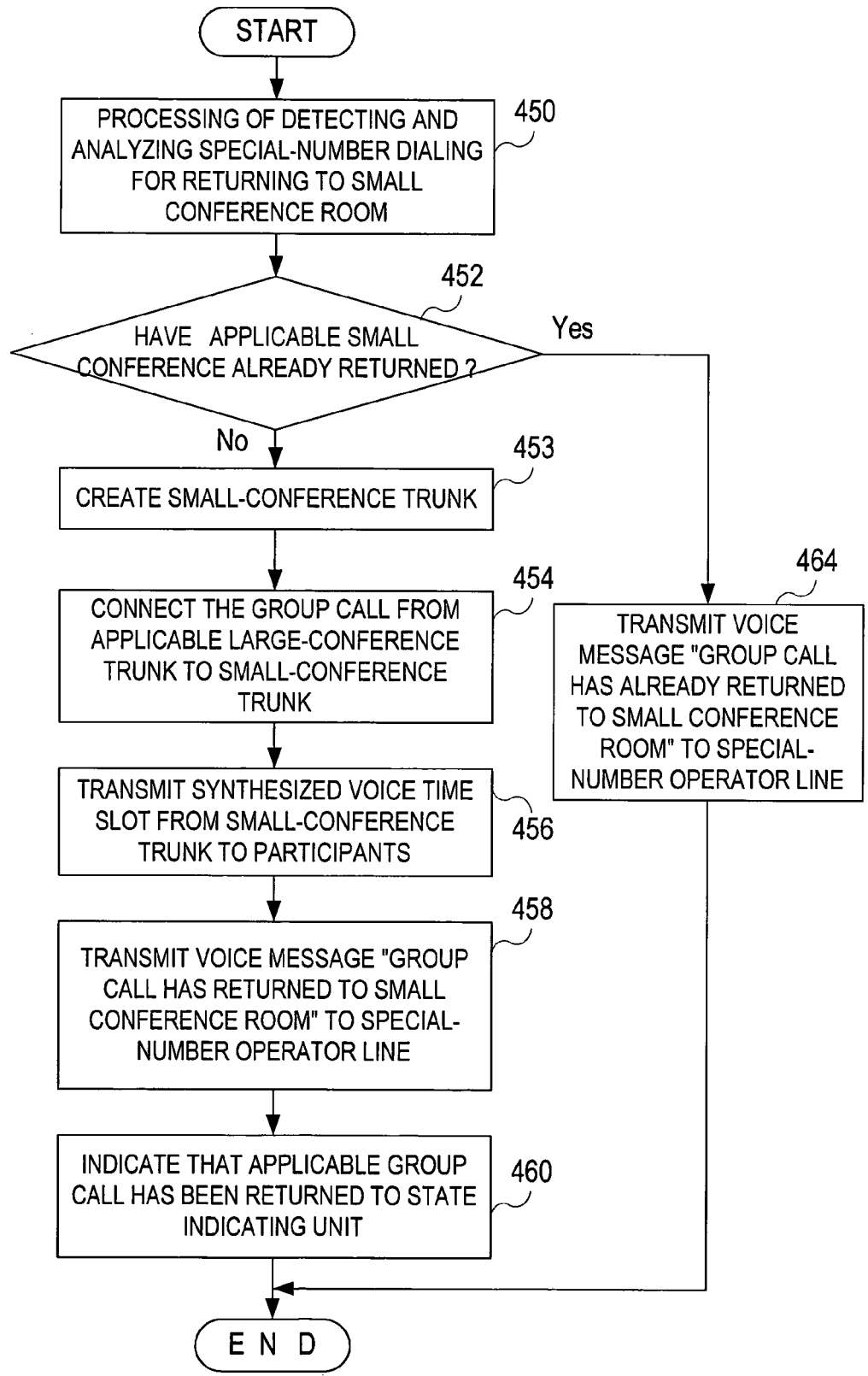
FIG. 25 is a flowchart illustrating processing by a control unit 1 for returning to a small conference room in the third system.
Figure 26:
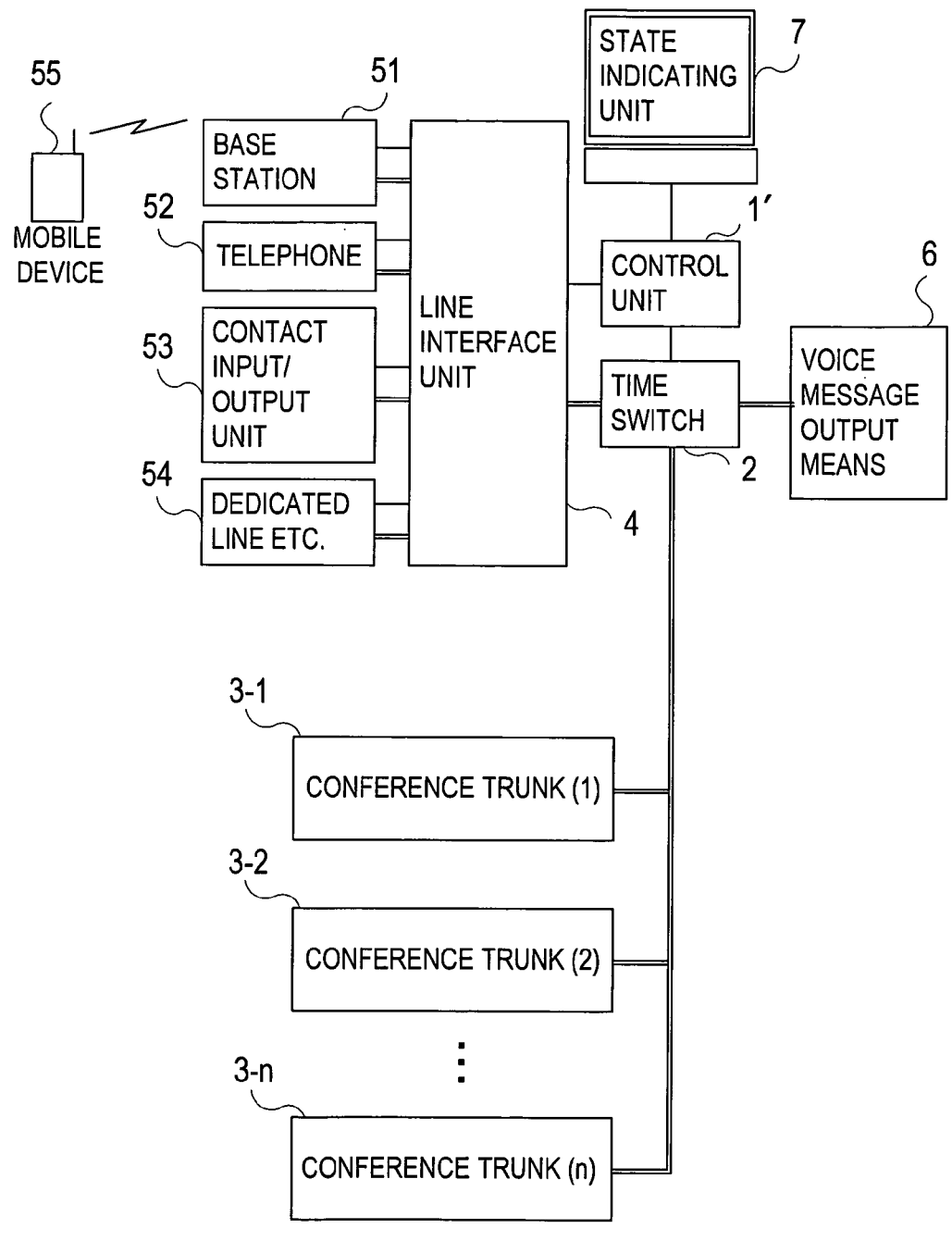
FIG. 26 is a schematic configuration diagram of a conventional telephone system.

[Processing for Returning to Small Conference Room/FIG. 25]

Next, with reference to FIG. 25, processing for returning from a large conference room to a small conference room in the third system will be described. FIG. 25 is a flowchart illustrating processing by the control unit 1 for returning to a small conference room in the third system.

As illustrated in FIG. 25, while a large group call is being performed in a large conference room, the control unit 1 performs monitoring whether a special number for returning to a small conference room is input or not as detection/analysis processing on dialing of a special number for returning to a small conference room, and, if the input is detected (450), determining whether the group call corresponding to the special number has already returned to the small conference room or not (452).

If the target group call has already returned to the small conference room, the control unit 1 outputs the voice message "the group call has already returned to the small conference room" to the line of the operator for the special number (464), and the processing ends.

If in step 452 the group call has not returned to the small conference room yet, the control unit 1 causes the conference trunk creating unit 30 to create a small-conference trunk (453) and connects the group call from the large-conference trunk functioning as a large conference room to the small-conference trunk (454). Here, the group calls excluding the group call having input the special number for returning are still kept connected to the large-conference trunk functioning as a large conference room.

Then, the control unit 1 controls the time switch 2 so as to transmit the voice synthesis time slot from the small-conference trunk to the participants (456).

The control unit 1 further outputs the voice message "the group call has returned to the small conference room" to the line of the operator for the special number (458) and indicates that the group call has returned to the small conference room in the state indicating unit 7 (460). In this way, the processing for returning to a small conference room can be performed.

Advantages of Third Embodiment

In the telephone system according to the third embodiment, the control unit 1 prestores, for each group call, a moving special number to a large conference room and a special number for returning to a small conference room. After a group call starts, if the corresponding moving special number to a large conference room is input, the control unit 1 causes the conference trunk creating unit 30 to create a large-conference trunk if no large-conference trunk functioning as a large conference room has been created, and connects the group call to the large-conference trunk. If a large-conference trunk has been created, the control unit 1 connects the group call to the large-conference trunk. Thus, in order for a group to start a conference in a large conference room, the corresponding moving special number to a large conference room may be input so that the group can participate in the conference in the large conference room as required. Without a predetermined combination of group calls to be multiplex, any group can enter to a large conference room and be multiplexed with another group, as required, for implementing a large group call. In order for a group to leave the large group call, the special number for returning to a small conference room may be input. Thus, the group can leave without influence on the entire large group call. As a result, the convenience can be improved.

In the third system, assuming plural large conference rooms and setting movement among them with the corresponding different special numbers allows a large group call in another large conference room, even when one large conference room is occupied. This further improves the convenience.

The invention is suitable for a telephone system in which voice synthesis can be implemented efficiently and at low costs flexibly in accordance with the multiplexing or demultiplexing of plural group calls and in which the voice level and/or voice quality of multiplexed group calls can be controlled in an optimum way.

What is claimed is:

1. A telephone system that implements a group call, the system comprising:
    a conference trunk creating unit that performs a conference trunk process as a virtual conference trunk by running a software program which corrects and synthesizes voices from plural terminals in accordance with an instruction; and
    a control unit that prestores a unique number of a group call and the numbers of plural terminals belonging to the group call, when the unique number of the group call is called, outputs an instruction to perform a conference trunk process to the conference trunk creating unit, calls the terminals belonging to the group call on the basis of the stored number, connects the calling terminal and OFF hooking terminals to the conference trunk process and starts the group call, wherein
    after plural group calls start by plural conference trunk processes, if the control unit receives the input of a multiplex request to multiplex the plural group calls, the control unit outputs an instruction to perform a conference trunk process for multiplexing to the conference trunk creating unit, and switches and connects the terminals participating in the plural group calls from the plural conference trunk processes to the conference trunk process for multiplexing.

2. The telephone system according to claim 1, wherein if the control unit receives the input of a demultiplex request to demultiplex a specific group call to plural group calls, the control unit identifies the group calls to be demultiplexed in accordance with the demultiplex request, outputs an instruction to perform new conference trunk processes for demultiplexing to the conference trunk creating unit on the basis of the number of the group calls to be demultiplexed, associates the new conference trunk processes for demultiplexing with the group calls to be demultiplexed, switches and connects the terminals belonging to the group calls to be demultiplexed from the conference trunk process of the specific group call to the new conference trunk processes for demultiplexing associated with the group calls to be demultiplexed, for each of the group calls to be demultiplexed, and starts the demultiplexed group calls.

3. The telephone system according to claim 1, further comprising a notifying unit that outputs a voice message to terminals participating in a group call on the basis of the instruction from the control unit, wherein:
    the control unit outputs the instruction to output a voice message indicating the multiplexed state to the notifying unit when plural group calls are multiplexed in accordance with a multiplex request.

4. The telephone system according to claim 2, further comprising a notifying unit that outputs a voice message to terminals participating in a group call on the basis of the instruction from the control unit, wherein:
    the control unit outputs the instruction to output a voice message indicating the multiplexed state to the notifying unit when plural group calls are multiplexed in accordance with a multiplex request.

5. The telephone system according to claim 2, further comprising a notifying unit that outputs a voice message to terminals participating in a group call on the basis of the instruction from the control unit, wherein:
    the control unit outputs the instruction to output a voice message indicating the demultiplexed state to the notifying unit when a specific group call is demultiplexed to plural group calls in accordance with a demultiplex request.

6. The telephone system according to claim 4, further comprising a notifying unit that outputs a voice message to terminals participating in a group call on the basis of the instruction from the control unit, wherein:
    the control unit outputs the instruction to output a voice message indicating the demultiplexed state to the notifying unit when a specific group call is demultiplexed to plural group calls in accordance with a demultiplex request.

7. The telephone system according to claim 1, further comprising an indicating unit, wherein:
the control unit causes the indicating unit to display a group-call multiplexed state and causes the indicating unit to display the entry states of terminals that can participate in the multiplexed group call.

8. The telephone system according to claim 2, further comprising an indicating unit, wherein:
the control unit causes the indicating unit to display a group-call multiplexed state and causes the indicating unit to display the entry states of terminals that can participate in the multiplexed group call.

9. The telephone system according to claim 3, further comprising an indicating unit, wherein:
the control unit causes the indicating unit to display a group-call multiplexed state and causes the indicating unit to display the entry states of terminals that can participate in the multiplexed group call.

10. The telephone system according to claim 4, further comprising an indicating unit, wherein:
the control unit causes the indicating unit to display a group-call multiplexed state and causes the indicating unit to display the entry states of terminals that can participate in the multiplexed group call.

11. The telephone system according to claim 5, further comprising an indicating unit, wherein:
the control unit causes the indicating unit to display a group-call multiplexed state and causes the indicating unit to display the entry states of terminals that can participate in the multiplexed group call.

12. The telephone system according to claim 6, further comprising an indicating unit, wherein:
the control unit causes the indicating unit to display a group-call multiplexed state and causes the indicating unit to display the entry states of terminals that can participate in the multiplexed group call.

* * * * *